(12) United States Patent
Borysek et al.

(10) Patent No.: US 12,361,415 B2
(45) Date of Patent: Jul. 15, 2025

(54) COMPUTING SYSTEMS AND METHODS FOR IDENTIFYING AND PROVIDING INFORMATION ABOUT RECURRING TRANSACTIONS

(71) Applicant: Discover Financial Services, Riverwoods, IL (US)

(72) Inventors: Anna Borysek, Park Ridge, IL (US); Lori Tobler, Libertyville, IL (US); Raviprakashreddy Dunnutala, Lake Zurich, IL (US); Yu Mao, Schaumburg, IL (US); Yawen Duan, Chicago, IL (US)

(73) Assignee: Discover Financial Services, Riverwoods, IL (US)

( * ) Notice: Subject to any disclaimer, the term of this patent is extended or adjusted under 35 U.S.C. 154(b) by 0 days.

(21) Appl. No.: 17/987,663

(22) Filed: Nov. 15, 2022

(65) Prior Publication Data

US 2024/0161110 A1   May 16, 2024

(51) Int. Cl.
*G06Q 20/40*    (2012.01)
*G06Q 20/08*    (2012.01)

(52) U.S. Cl.
CPC ......... *G06Q 20/401* (2013.01); *G06Q 20/085* (2013.01); *G06Q 20/40* (2013.01)

(58) Field of Classification Search
None
See application file for complete search history.

(56) References Cited

U.S. PATENT DOCUMENTS

| | | | |
|---|---|---|---|
| 7,693,771 B1 | 4/2010 | Zimmerman et al. | |
| 8,311,943 B2 | 11/2012 | Patterson | |
| 8,762,238 B2 | 6/2014 | Hahn-Carlson et al. | |
| 10,713,660 B2 | 7/2020 | Awasthi | |
| 11,195,177 B1 | 12/2021 | Vijayvergia | |
| 2020/0065426 A1* | 2/2020 | Hart | G06F 16/904 |

(Continued)

OTHER PUBLICATIONS

Capital One. "How to Understand & Manage Recurring Charges", Apr. 21, 2022, 4 pages. [retrieved on Jul. 14, 2022], Retrieved from the Internet: URL: <https://www.capitalone.com/learn-grow/money-management/recurring-charges/>.

(Continued)

*Primary Examiner* — William J Jacob
(74) *Attorney, Agent, or Firm* — Lee Sullivan Shea & Smith LLP

(57) ABSTRACT

A computing platform is configured with new software technology for accurately identifying recurring charges and facilitating interaction with identified recurring charges, which may involve functionality for (a) obtaining data for a given transaction involving a given customer account and a given merchant, (b) applying pre-processing logic to the obtained data for the given transaction and thereby derive feature data for the given transaction, (c) inputting the feature data for the given transaction into a trained machine-learning model that functions to (i) evaluate the feature data for the given transaction and (ii) based on the evaluation, output a score for the given transaction that indicates a likelihood that the given transaction is a recurring charge, and (d) based on the score for the given transaction, determining whether to classify the given transaction as a recurring charge.

19 Claims, 10 Drawing Sheets

(56) References Cited

U.S. PATENT DOCUMENTS

| | | | |
|---|---|---|---|
| 2020/0202315 A1* | 6/2020 | Mohandas | G06Q 20/389 |
| 2020/0242134 A1 | 7/2020 | Salhin | |
| 2021/0117851 A1 | 4/2021 | Jumper et al. | |
| 2021/0133752 A1 | 5/2021 | Harris et al. | |
| 2022/0036386 A1* | 2/2022 | Horesh | G06Q 30/0207 |
| 2022/0245641 A1* | 8/2022 | Wintle | G06Q 20/102 |
| 2022/0253817 A1* | 8/2022 | Sosna | G06Q 20/405 |

OTHER PUBLICATIONS

Capital One. "Help Track Increases in Recurring Charges With Eno", Jan. 19, 2021, 3 pages. [retrieved on Jul. 14, 2022], Retrieved from the Internet: URL: <https://www.capitalone.com/learn-grow/money-management/eno-recurring-charges/>.

International Searching Authority. International Search Report and Written Opinion issued in International Application No. PCT/US2023/079649, mailed on Mar. 18, 2024, 9 pages.

\* cited by examiner

COMPUTING SYSTEMS AND METHODS FOR IDENTIFYING AND PROVIDING INFORMATION ABOUT RECURRING TRANSACTIONS

BACKGROUND

Financial institutions offer a variety of financial services to their customers, examples of which may include financial accounts such as checking accounts, savings accounts, credit card accounts, loans and mortgages, and wealth management, among other possibilities. Previously, in order to take advantage of these financial services, a financial institution's customers were required to visit a brick-and-mortar outpost of the financial institution, contact the financial institution by telephone, and/or exchange physical mail with the financial institution. Today, most financial institutions operate computing platforms that enable the financial institution to provide various financial services to its customers over a data network such as the Internet.

BRIEF SUMMARY OF INVENTION

Disclosed herein is new software technology for accurately identifying recurring charges and facilitating interaction with identified recurring charges.

In one aspect the disclosed technology may take the form of a method to be carried out by a computing platform that involves (a) obtaining data for a given transaction involving a given customer account and a given merchant, (b) applying pre-processing logic to the obtained data for the given transaction and thereby derive feature data for the given transaction, (c) inputting the feature data for the given transaction into a trained machine-learning model that functions to (i) evaluate the feature data for the given transaction and (ii) based on the evaluation, output a score for the given transaction that indicates a likelihood that the given transaction is a recurring charge, and (d) based on the score for the given transaction, determining whether to classify the given transaction as a recurring charge.

The data obtained for the given transaction may take various forms, and in some example embodiments, may include (i) transaction-level data for the given transaction, (ii) merchant-level data for the given transaction, and (iii) account-merchant-level data for the given transaction.

The transaction-level data for the given transaction may take various forms, and in some example embodiments, may comprise one or both of (i) authorization data for the given transaction or (ii) settlement data for the given transaction.

The merchant-level data for the given transaction may take various forms, and in some example embodiments, may comprise historical transaction data for past transactions involving the given merchant.

The account-merchant-level data for the given transaction may take various forms, and in some example embodiments, may comprise historical transaction data for past transactions involving the given customer account and the given merchant.

The feature data for the given transaction may take various forms, and in some example embodiments, may comprise (i) one or more transaction-level features for the given transaction, (ii) one or more merchant-level features for the given transaction, and (iii) one or more account-merchant-level features for the given transaction.

In embodiments where the feature data comprises one or more transaction-level features for the given transaction, the one or more transaction-level features for the given transaction may take various forms, and in some example embodiments, may comprise one or both of (i) a feature that indicates whether an authorization time of the given transaction occurred within a particular window of time or (ii) a feature that indicates whether a settlement amount of the given transaction meets certain criteria that is indicative of a recurring charge.

In embodiments where the feature data comprises one or more merchant-level features for the given transaction, the one or more merchant-level features may take various forms, and in some example embodiments, may comprise one or more of (i) a feature that indicates a size of the given merchant, (ii) a feature that indicates a concentration of the given merchant's historical transactions of a given type from a given past timeframe with respect to a transaction amount, an authorization date, or an authorization time, or (iii) a feature that indicates an extent of the given merchant's historical transactions of a given type from a given past timeframe that share a common characteristic with the given transaction.

In embodiments where the feature data comprises one or more account-merchant-level features for the given transaction, the one or more account-merchant-level features may take various forms, and in some example embodiments, may comprise at least one feature that indicates an extent of historical transactions of a given type involving the given financial account and the given merchant from a given past timeframe that follow a given frequency-based transaction pattern.

The given frequency-based transaction pattern may take various forms, and in some example embodiments, may comprise one of a weekly transaction pattern, a bi-weekly transaction pattern, a monthly transaction pattern, a bi-monthly transaction pattern, a quarterly transaction pattern, a bi-annual transaction pattern, or an annual transaction pattern.

The trained machine-learning model may take various forms, and in some example embodiments, may comprise a gradient boosting machine (GBM) model.

The function of determining whether to classify the given transaction as a recurring transaction may take various forms, and in some example embodiments, may involve (a) comparing the score for the given transaction to a score threshold, and (b) based on the comparison, either (i) determine that the given transaction is classified as a recurring charge if the score meets or exceeds the score threshold or (ii) determine that the given transaction is classified as a non-recurring charge if the score is below the score threshold.

The method to be carried out by the computing platform may further involve (a) storing the score that represents the likelihood that the given transaction is a recurring transaction, and (b) storing an indication of whether the given transaction is classified as a recurring charge or a non-recurring charge.

In embodiments where the given transaction is classified as a recurring transaction, the method may further involve providing, to an end-user device associated with an account holder of the customer account over a data network, an indication that the given transaction is classified as a recurring transaction.

In another aspect, disclosed herein is a computing platform that includes at least one network interface, at least one processor, at least one non-transitory computer-readable medium, and program instructions stored on the at least one non-transitory computer-readable medium that are executable by the at least one processor such that the computing platform is configured to carry out the functions disclosed herein, including but not limited to the functions of the foregoing method.

In yet another aspect, disclosed herein is at least one non-transitory computer-readable medium that is provisioned with program instructions that, when executed by at least one process, cause a computing platform to carry out functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 5B depicts a screenshot of one possible example GUI view that may be displayed at an end-user device associated with an account holder after the account holder accesses a recurring-charges dashboard.

FIG. 5C depicts a screenshot of another possible example GUI view that may be displayed at an end-user device associated with an account holder after the account holder accesses a recurring-charges dashboard.

Figure 1:
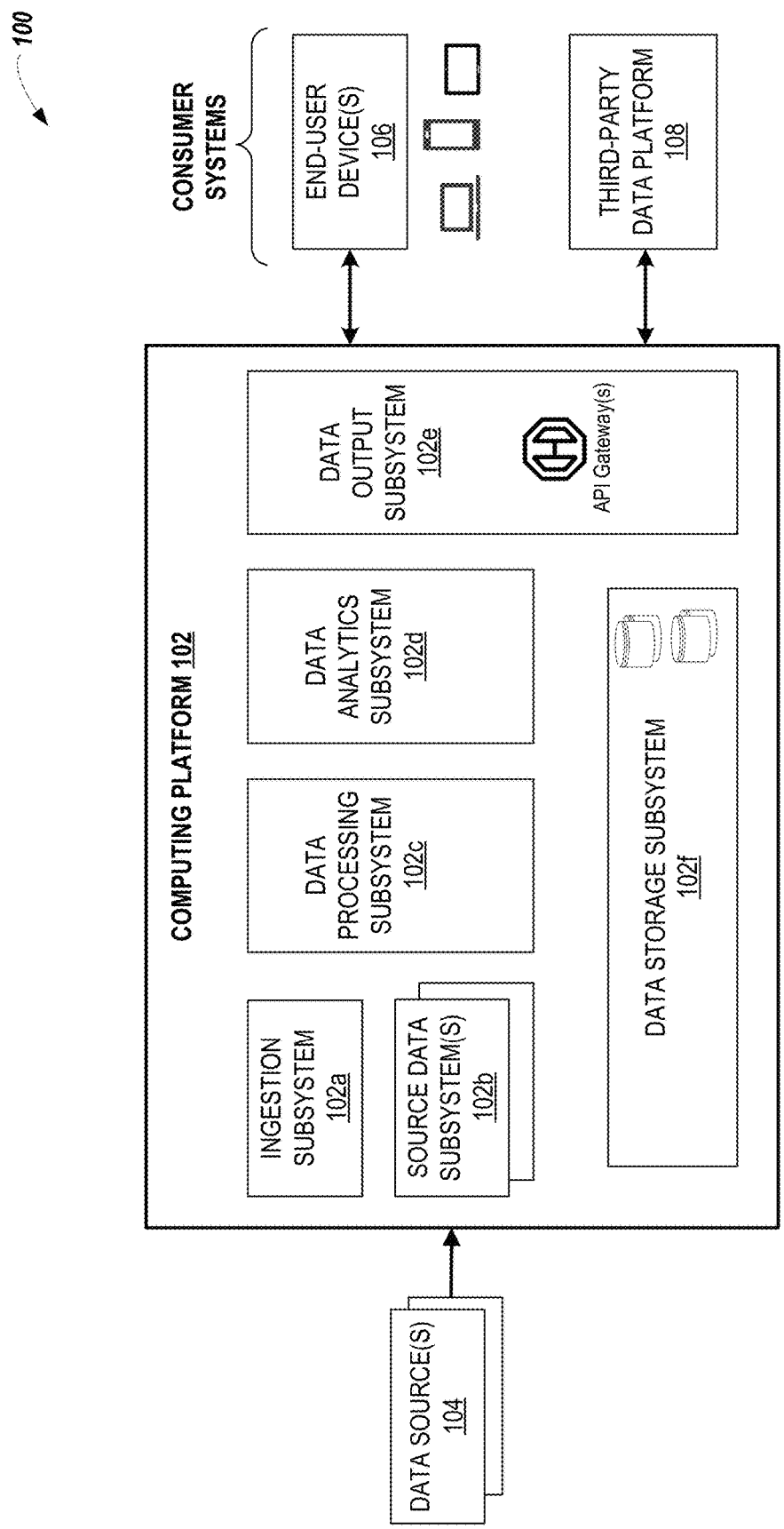
FIG. 1 depicts an example network configuration including an example computing platform operated by a financial institution.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As noted above, financial institutions may offer any of various types of financial services to their customers, examples of which may include financial accounts such as checking accounts, savings accounts, credit card accounts, loans and mortgages, and wealth management, among other possibilities. Previously, in order to take advantage of these financial services, a financial institution's customers would have to visit a brick-and-mortar outpost of the financial institution, contact the financial institution by telephone, and/or exchange physical mail with the financial institution, which was often cumbersome and inefficient. However, most financial institutions today now operate computing platforms that enable the financial institution to provide various financial services to its customers over a data network such as the Internet.

To illustrate with an example, FIG. 1 depicts a network environment 100 that includes at its core an example computing platform 102 of a financial institution, which may comprise a collection of functional subsystems that are each configured to perform certain functions in order to facilitate tasks such as data ingestion, data generation, data processing, data analytics, data storage, and/or data output related to the financial services being provided by the financial institution to its customers. These functional subsystems may take various forms.

For instance, as shown in FIG. 1, the example computing platform 102 may comprise an ingestion subsystem 102a that is generally configured to ingest source data from a particular set of one or more data sources 104 over respective communication paths. In general, these data sources 104 may comprise any computing devices and/or systems that generate and output data related to the financial institution's customers and/or their financial accounts, such as financial activity data (e.g., financial transactions, spending activity, etc.), account identification data (e.g., account identifiers, personal account numbers, etc.), credit history data, and/or merchant data (e.g., merchants involved in transactions with the customers' financial accounts), among various other possibilities. In this respect, the data sources that generate and output such data may take the form of payment processors, merchant service provider systems such as payment gateways, point-of-sale (POS) terminals, automated teller machines (ATMs), computing systems at brick-and-mortar branches of the financial institution, and/or end-user devices of customers (e.g., personal computers, mobile phones, tablets, etc.), among various other possibilities. The data sources 104 may take various other forms as well.

Further, as shown in FIG. 1, the example computing platform 102 may comprise one or more source data subsystems 102b that are configured to internally generate and output source data that is consumed by the example computing platform 102. In general, these one or more source data subsystems 102b may comprise any software subsystems that internally generate and output certain types of data related to the financial institution's customer and/or their financial accounts (e.g., account balance data, payment schedule data, etc.). The one or more source data subsystems 102b may take various other forms as well.

Further yet, as shown in FIG. 1, the example computing platform 102 may comprise a data processing subsystem 102c that is configured to carry out certain types of processing operations on the source data. These processing operations could take any of various forms, including but not limited to data preparation, transformation, and/or integration operations such as validation, cleansing, deduplication, filtering, aggregation, summarization, enrichment, restructuring, reformatting, translation, mapping, etc.

Still further, as shown in FIG. 1, the example computing platform 102 may comprise a data analytics subsystem 102d that is configured to carry out certain types of data analytics operations based on the processed data in order to derive insights, which may depend at least in part on the type of organization operating the example computing platform 102. For example, the data analytics subsystem 102d may be configured to carry out data analytics operations in order to derive certain types of insights related to the financial institution's customers and/or their financial accounts, examples of which could include insights related to a customer's spending habits, insights to assist a customer with financial planning, predictions of fraud or other suspicious activity on a customer's account, and/or predictions of whether to extend credit to an existing or prospective customer, among various other possibilities. The data analytics subsystem 102d may be configured to carry out any of numerous other types of data analytics operations as well.

Moreover, the data analytics operations carried out by the data analytics subsystem 102d may be embodied in any of various forms. As one possibility, a data analytics operation may be embodied in the form of a set of user-defined rules that are applied to a particular subset of the processed data in order to derive insights from that processed data. As another possibility, a data analytics operation may be embodied in the form of a data science model that is applied to a particular subset of the processed data in order to derive insights from that processed data. In practice, such a data science model may comprise a machine-learning model that has been created by applying one or more machine-learning techniques to a set of training data, but data science models for performing data analytics operations could take other forms and be created in other manners as well. The data analytics operations carried out by the data analytics subsystem 102d may be embodied in other forms as well.

Referring again to FIG. 1, the example computing platform 102 may also comprise a data output subsystem 102e that is configured to output data (e.g., processed data and/or derived insights) to certain consumer systems over respective communication paths. These consumer systems may take any of various forms.

For instance, as one possibility, the data output subsystem 102e may be configured to output certain data to end-user devices that are running software applications for accessing and interacting with the example computing platform 102, such as the three representative end-user devices 106 shown in FIG. 1, each of which may take the form of a desktop computer, a laptop, a netbook, a tablet, a smartphone, or a personal digital assistant (PDA), among other possibilities. These end-user devices 106 may be associated with customers of the financial institution and/or individuals that work for or with the financial institution (e.g., employees, contractors, etc.), among other possibilities. Further, the software applications for accessing and interacting with the example computing platform 102 that run on these end-user devices 106 may take any of various forms, examples of which may include native applications (e.g., mobile apps), web applications, and/or hybrid applications, among other possibilities.

In order to facilitate this functionality for outputting data to end-user devices 106, the data output subsystem 102e may comprise (i) Application Programming Interface (APIs) that can be used to interact with and output certain data to the end-user devices 106 over a data network, and/or (ii) application service subsystems that are configured to drive the different software applications that may be running on the end-user devices, among other possibilities.

As another possibility, the data output subsystem 102e may also be configured to output certain data to other third-party data platforms, such as the representative third-party data platform 108 shown in FIG. 1, via APIs or the like.

The data output subsystem 102e may be configured to output data to other types of consumer systems as well.

Referring again to FIG. 1, the example computing platform 102 may also comprise a data storage subsystem 102f that is configured to store all of the different data within the example computing platform 102, including but not limited to the source data, the processed data, and the derived insights. In practice, this data storage subsystem 102f may comprise several different data stores that are configured to store different categories of data. For instance, although not shown in FIG. 1, this data storage subsystem 102f may comprise one set of data stores for storing source data and another set of data stores for storing processed data and derived insights. However, the data storage subsystem 102f may be structured in various other manners as well. Further, the data stores within the data storage subsystem 102f could take any of various forms, examples of which may include relational databases (e.g., Online Transactional Processing (OLTP) databases), NoSQL databases (e.g., columnar databases, document databases, key-value databases, graph databases, etc.), file-based data stores (e.g., Hadoop® Distributed File System or Amazon® Elastic File System), object-based data stores (e.g., Amazon® S3), data warehouses (which could be based on one or more of the foregoing types of data stores), data lakes (which could be based on one or more of the foregoing types of data stores), message queues, and/or streaming event queues, among other possibilities.

The example computing platform 102 may comprise various other functional subsystems and take various other forms as well.

In practice, the example computing platform 102 may generally comprise some set of physical computing resources (e.g., processors, data storage, etc.) that are utilized to implement the functional subsystems discussed herein. This set of physical computing resources take any of various forms. As one possibility, the computing platform 102 may comprise cloud computing resources that are supplied by a third-party provider of "on demand" cloud computing resources, such as Amazon Web Services (AWS®), Amazon® Lambda, Google® Cloud Platform (GCP), Microsoft Azure®, or the like. As another possibility, the example computing platform 102 may comprise "on-premises" computing resources of the organization that operates the example computing platform 102 (e.g., organization-owned servers). As yet another possibility, the example computing platform 102 may comprise a combination of cloud computing resources and on-premises computing resources. Other implementations of the example computing platform 102 are possible as well.

Further, in practice, the functional subsystems of the example computing platform 102 may be implemented using any of various software architecture styles, examples of which may include a microservices architecture, a service-oriented architecture, and/or a serverless architecture, among other possibilities, as well as any of various deployment patterns, examples of which may include a containerbased deployment pattern, a virtual-machine-based deployment pattern, and/or a Lambda-function-based deployment pattern, among other possibilities.

As noted above, the example computing platform 102 may be configured to interact with the data sources 104 and consumer systems such as end-user devices 106 and third-party platform(s) 108 over respective communication paths. Each of these communication paths may generally comprise one or more data networks and/or data links, which may take any of various forms. For instance, each respective communication path with the example computing platform 102 may include any one or more of Personal Area Networks (PANs), Local Area Networks (LANs), Wide Area Networks (WANs) such as the Internet or cellular networks, cloud networks, and/or point-to-point data links, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

It should be understood that the network environment 100 is one example of a network environment in which a data platform may be operated, and that numerous other examples of network environments, data platforms, data sources, and consumer systems are possible as well.

As mentioned above, financial institutions today operate computing platforms to provide financial services to their customers, which may take various forms. As one example, such financial services may take the form of financial accounts. Customers may use their financial accounts to engage in various types of financial transactions, such as making purchases. Purchases may be made using various means of payment, such as a payment card (e.g., a credit or debit card), a digital wallet, or a direct withdrawal, among other possibilities. To illustrate with an example, the process for making a purchase transaction with a payment card typically begins with a customer providing a merchant (e.g., a person or organization that sells goods and/or services) with identifying information for the payment card, which may include a primary account number (PAN), such as a credit card number or debit card number, an expiration date, and a card verification value (CVV), which typically takes the form of a three-digit code listed on the back of the payment card. The customer may provide this information by either presenting the payment card at a physical location for interaction (e.g., swipe, tap, insert, etc.) with a point-of-sale (POS) terminal of the merchant for an in-person purchase or providing the payment card identifying information over the Internet for a remote purchase.

After the customer's payment card information is provided to the merchant, an authorization process may be carried out whereby the merchant's system (e.g., the merchant's POS terminal or an online payment gateway) sends the payment card information along with other information about the transaction (e.g., purchase amount, date, time, etc.) to an acquiring bank (e.g., the merchant's financial institution), which in turn sends that information via an appropriate payment network (e.g., Visa, Mastercard, etc.) to the issuing bank for the payment card (i.e., the customer's financial institution). The issuing bank verifies the received payment card information (e.g., the PAN and the CVV) to determine if the purchase is authorized by the customer and also determines whether or not the customer has sufficient funds (e.g., enough remaining credit for a credit card purchase, enough funds for a debit card purchase, etc.) to pay for the purchase. The issuing bank provides a response to the merchant's system indicating whether authorization for the transaction is approved or declined. If the transaction is approved, the payment card identifying information may be stored with other information about the authorized transaction at the merchant's system for settlement.

Thereafter, the merchant may initiate a process for settling the authorized transaction (i.e., collecting the funds for the transaction). The merchant's system may send the information for the authorized transaction—typically as part of a batch of authorized transactions that were processed during a given period of time—to the acquiring bank, which will then confirm the authorized transaction and pass the transaction information via the appropriate payment network to the issuing bank. The acquiring bank will deposit funds owed to the merchant for the authorized transaction into a financial account associated with the merchant, and the issuing bank will provide payment for the authorized transaction to the acquiring bank via the card network. Thereafter, the customer is charged by the issuing bank for the transaction, which the customer pays according to its card agreement with the issuing bank.

Purchase transactions for goods or services may be "recurring" or "non-recurring." A recurring transaction is one in a series of transactions involving the same financial account and same merchant where a customer's financial account is charged automatically by the merchant at regular intervals for ongoing provision of goods or services. The customer's financial account continues to be charged regularly by the merchant on some ongoing basis (e.g., weekly, biweekly, monthly, bimonthly, annually, etc.) until the customer ceases the transactions (e.g., by canceling the provision of the goods or services). Recurring transactions, which are also referred to herein as recurring charges, may be either fixed or variable. With a fixed recurring charge, a customer is charged the same amount for each transaction in the series of transactions. Examples of a fixed recurring charge include a subscription to a gym membership (e.g., XSport Fitness®, etc.) or a subscription to a media streaming service (e.g., Netflix®, Hulu®, etc.), among other possibilities. With a variable recurring charge, the amount that a customer is charged for each transaction in a series of transactions is based on the customer's usage of a product or service. Examples of a variable recurring charge include a payment for a utility service, such as an electricity bill or a gas bill, that is charged based on the customer's monthly electricity or gas consumption, among other possibilities. On the other hand, a non-recurring transaction is typically a transaction where a customer's financial account is charged one time for provision of goods or services, such as a purchase at a retail store or a restaurant, as some examples.

The ability for customers to engage in recurring transactions with merchants provides several conveniences for the customers. For example, recurring transactions alleviate the burden on customers to actively remember to make timely payments in order to avoid late fees, and also alleviate the need for customers to provide payment information for each billing cycle, among other advantages of utilizing recurring transactions.

However, the ability for a customer to engage in recurring transactions with merchants can also give rise to certain downsides. For example, once a customer sets up a recurring transaction arrangement with a merchant, that recurring transaction arrangement will typically continue indefinitely until the customer affirmatively cancels the recurring transaction arrangement, which may expose the customer to a risk of inadvertently continuing to pay for goods or services that are no longer being utilized by the customer. As another example, after a customer sets up a recurring transaction arrangement with a merchant, it is possible that the merchant could increase the regularly-charged amount for the good or service being provided as part of the recurring transaction arrangement and then automatically begin charging the customer that increased amount without the customer having sufficient notice of the increased pricing. As yet another example, a situation could arise where a customer intends to make a one-time payment to a merchant, but due to some error made by either the customer or the merchant, a recurring transaction arrangement is instead initiated such that the merchant begins charging the customer on a recurring basis.

For these and other reasons, there is a need for technology that provides customers with information about recurring charges being made on the customers' financial accounts. Indeed, providing a customer with information about recurring charges being made on the customer's financial accounts enables the customer to timely cancel recurring transaction arrangements for goods or services that are no longer needed, identify pricing changes to existing transaction arrangements, and identify cancel recurring transaction arrangements that the customer did not intend to authorize, which may help to offset the potential downsides of recurring transactions. Additionally, providing a customer with information about recurring transactions being made on the customer's financial accounts may improve the customer's user experience in various other ways as well. As one example, providing a customer with information about recurring transactions being made on the customer's financial accounts may improve the customer's ability to track past spending activity and monitor the distribution of the customer's monthly expenses. As another example, providing a customer with information about recurring transactions being made on the customer's financial accounts may be useful for budgeting purposes, because it gives the customer visibility as to expenses that should be built into a monthly budget. As yet another example, example, providing a customer with information about recurring transactions may be useful for financial planning purposes, because it gives the customer visibility as to expenses that the customer may wish to eliminate in order to increasing the customer's savings. As still another example, providing a customer with information about recurring transactions being made on the customer's financial accounts may help streamline the process for updating the customer's payment details when the customer gets a new credit or debit card that the customer wishes to use for recurring transactions, because the customer can use the information about recurring charges made with a prior credit or debit card as a basis for identifying which recurring transaction arrangements need to be updated with the new credit or debit card information. Providing a customer with information about recurring transactions may improve the customer's user experience in many other ways as well.

In view of the foregoing, certain technology for providing a customer with information about recurring transactions being made on the customer's financial accounts has been developed. For example, certain merchants have begun to encode information into transaction data for certain types of transactions that is indicative of whether the transactions are recurring, and certain financial institutions have configured their data platforms to process and utilize this encoded information as a basis for identifying recurring transactions and then surfacing recurring-charges information to the financial institutions' customers. However, this existing technology for identifying recurring transactions does not provide a sufficient level of accuracy, which is due to the fact that the merchant-encoded information being used to identify recurring transactions is prone to inaccuracies. For instance, it has been observed that merchants fail to flag a sizable percentage of legitimate recurring transactions as such (e.g., 20% or more) and may also incorrectly flag non-recurring charges as recurring, which is problematic for many reasons. For instance, misidentification of a recurring transaction (e.g., either failing to identify a recurring charge as such or misidentifying a non-recurring charge as recurring) may cause a customer to rely on inaccurate information during monitoring of financial activity, budgeting, or financial planning as described above. Further, in some instances, misidentification of a recurring transaction may cause a customer to take action to inquire into the misidentification and/or attempt to fix the misidentification—perhaps by attempting to contact the financial institution and/or the merchant over the phone, via email correspondence, or via live chat, all of which can often take a prolonged period of time, not only the process of getting in touch with an appropriate human representative who can provide information about the misidentification and work with the customer to reach a resolution, but also the process of resolving the misidentification—which can result in an unpleasant and frustrating user experience and perhaps also even dissatisfaction with and loss of trust in the financial institution and its ability to provide satisfactory service to its customers.

To address these and other problems with existing technology for identifying recurring charges and surfacing recurring-charges information, disclosed herein is new software technology for accurately identifying recurring charges and facilitating interaction with identified recurring charges that improves upon existing technology for identifying recurring charges. At a high level, the disclosed technology may function to (i) obtain data for a financial transaction, (ii) transform the obtained data into feature data, (iii) apply data analytics to the feature data and thereby determine an output that represents a likelihood that the financial transaction is recurring, and (iv) apply post-processing logic to the output in order to determine whether or not the financial transaction is recurring. Further, the disclosed technology involves presenting an interface that facilitates management of and interaction with financial transactions that have been identified as recurring charges.

The data analytics that are applied by the disclosed software technology to identify recurring charges may take various forms. As one possibility, the data analytics may be embodied in the form of a data science model that is configured to receive a particular set of input data for a given transaction involving a charge to a given customer account by a given merchant (e.g., input data that is indicative of whether or not the given transaction is a recurring charge) and then determine and output a score that represents a likelihood that the given transaction is recurring (e.g., a value between 0 and 1).

In practice, the disclosed technology may be employed by any financial institution that has issued and maintains customer accounts that can be used to engage in transactions involving recurring charges (e.g., credit card accounts, deposit accounts, etc.), which may be referred to herein as an "issuing financial institution."

Figure 2:
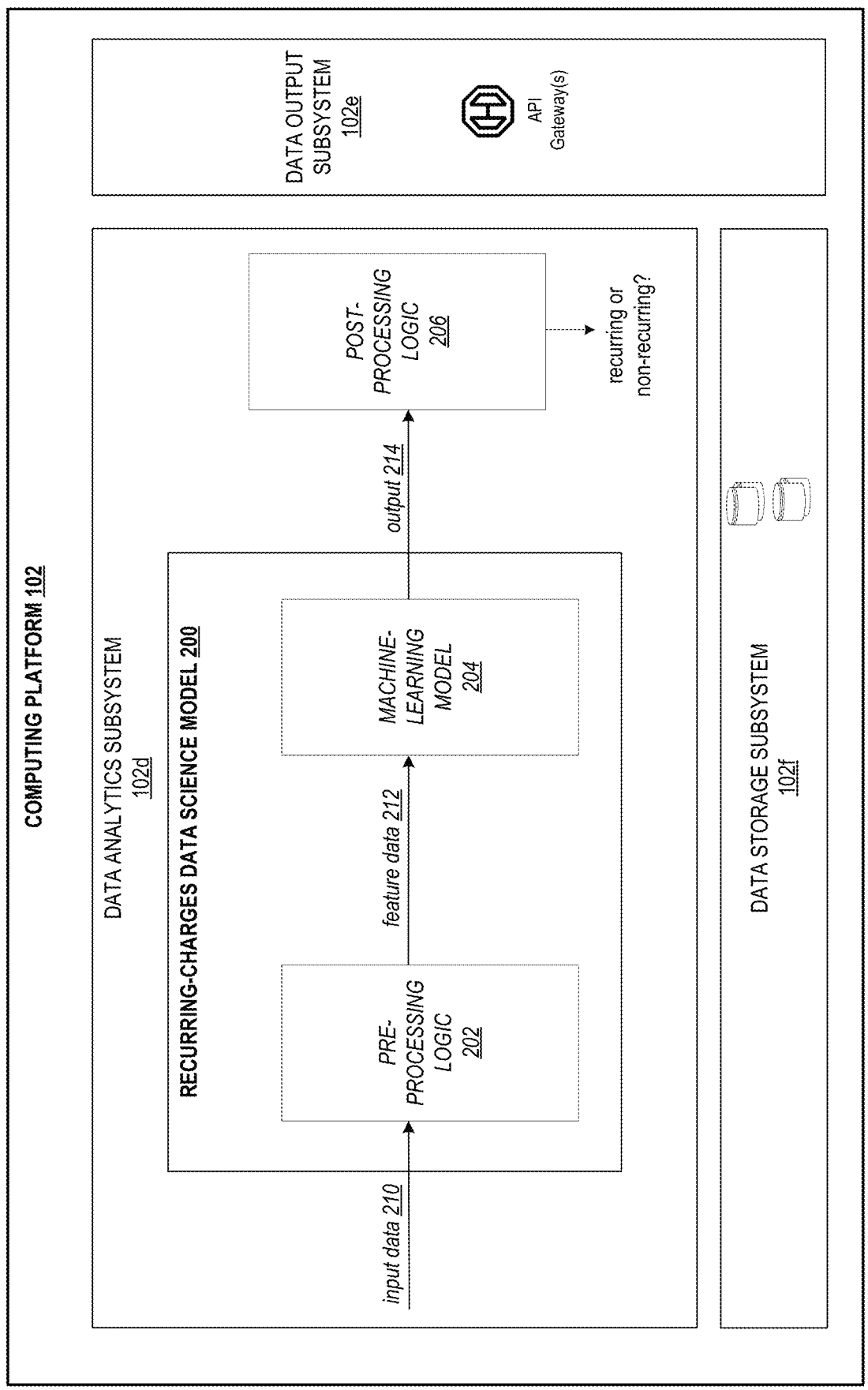
FIG. 2 depicts an example architecture of an example recurring-charges data science model that may be executed by a data analytics subsystem of a computing platform according to aspects of the disclosed technology.

FIG. 2 depicts a conceptual illustration of one example of a data science model 200 for predicting whether transactions involve recurring charges in accordance with the present disclosure, which may also be referred to herein as a "recurring-charges" model. In the example of FIG. 2, the recurring-charges model 200 is shown as being deployed within the example computing platform 102 of FIG. 1, and in particular the data analytics subsystem 102d of the computing platform 102 of FIG. 1, but it should be understood that the recurring-charges model 200 may be deployed within any computing platform that is capable of executing the disclosed recurring-charges model 200.

As shown in FIG. 2, the recurring-charges model 200 may comprise pre-processing logic 202 and a machine-learning model 204. At a high level, the pre-processing logic 202 may function to (i) receive input data 210 for a given transaction involving a given customer account and a given merchant, and (ii) transform the input data 210 for the given transaction into feature data 212 for the given transaction, which is then provided as input to the machine-learning model 204. In turn, the machine-learning model 204 may comprise any trained model object that is configured to (i) receive the feature data 212 for the given transaction as input, (ii) evaluate the feature data 212 for the given transaction, and (iii) based on the evaluation of the feature data, determine and output a score that represents a likelihood that the given transaction is a recurring charge (e.g., a value between 0 and 1), which may serve as an output 214 of the recurring-charges model 200. As further shown in FIG. 2, the data analytics subsystem 102d may then apply post-processing logic 206 (e.g., a score threshold) to the output 214 of the recurring-charges model 200 in order to determine whether or not to classify the given transaction as a recurring charge. These aspects of the recurring-charges model 200 will now be described in greater detail.

To begin, the input data 210 for the given transaction that is input into the recurring-charges model 200 may generally comprise any data that may be utilized to produce the feature data 212 for the given transaction. Such input data 210 could take any of various forms.

A first possible category of input data 210 for the given transaction that is to be input into the recurring-charges model 200 may comprise data about the given transaction itself, which may be referred to herein as "transaction-level data." This transaction-level data may take any of various forms.

As one possibility, the transaction-level data for the given transaction that could be input into the recurring-charges model 200 may include data related to the authorization of the given transaction, which may be referred to herein as "authorization data." Such authorization data may take various forms. As one example, the authorization data for the given transaction that could be input into the recurring-charges model 200 may include identifying information for the given customer account involved in the given transaction that was authorized, such as one or more account identification numbers (e.g., an account key, an untokenized or tokenized account number such as a PAN, etc.) and/or an identifier of the issuing financial institution for the given customer account, among other possibilities. As another example, the authorization data for the given transaction that could be input into the recurring-charges model 200 may include identifying information for the given merchant involved in the given transaction that was authorized, such as one or more merchant identification numbers, a merchant name, and/or a merchant category code (MCC), among other possibilities. As yet another example, the authorization data for the given transaction that could be input into the recurring-charges model 200 may include details about the authorization of the given transaction, such as one or more identification numbers assigned to the authorized transaction, the authorized transaction's type (e.g., credit card vs. debit card vs. direct withdrawal, card-present vs. card-not-present, etc.), a date and time of the authorization, and/or an authorization amount, among other possibilities. The authorization data for the given transaction that could be input into the recurring-charges model 200 may take other forms as well.

Further, in practice, the authorization data for the given transaction that could be input into the recurring-charges model 200 may have previously been stored by the computing platform 102 (e.g., in the data storage subsystem 102f), in which case the function of obtaining the authorization data for the given transaction that is to be provided as input data 210 for the recurring-charges model 200 may involve the computing platform 102 retrieving the authorization data for the given transaction from data storage. In this respect, the stored authorization data for the given transaction could comprise any one or more of (i) authorization data that was previously received by the computing platform 102 during the authorization process for the given transaction, (ii) authorization data that was previously generated by the computing platform 102 during or after the authorization process for the given transaction, and/or (iii) authorization data that was previously received by the computing platform 102 from some other source after the authorization process for the given transaction was completed, among other possibilities. However, it should be understood that the authorization data for the given transaction that could be input into the recurring-charges model 200 may be obtained in other manners as well.

As another possibility, the transaction-level data for the given transaction that could be input into the recurring-charges model 200 may include data related to the settlement of the given transaction, which may be referred to herein as "settlement data." Such settlement data may take various forms. As one example, the settlement data for the given transaction that could be input into the recurring-charges model 200 may include identifying information for the given customer account involved in the given transaction that was settled, such as one or more account identification numbers (e.g., an account key, an untokenized or tokenized account number such as a PAN, etc.), a CVV, and/or expiration date (for a credit or debit card transaction), and/or an identifier of the issuing financial institution for the given customer account, among other possibilities. As another example, the settlement data for the given transaction that could be input into the recurring-charges model 200 may include identifying information for the given merchant involved in the given transaction that was settled, such as one or more merchant identification numbers, a merchant name, and/or an MCC, among other possibilities. As yet another example, the settlement data for the given transaction that could be input into the recurring-charges model 200 may include details about the settlement of the given transaction, such as one or more identification numbers assigned to the settled transaction, the settled transaction's type (e.g., credit card vs. debit card vs. direct withdrawal, card-present vs. card-not-present, etc.), a date and time of the settlement, and/or a settlement amount, among other possibilities. The settlement data for the given transaction that may be used as input data 210 for the recurring-charges model 200 may take other forms as well.

Further, in practice, the settlement data for the given transaction that could be input into the recurring-charges model 200 may have previously been stored by the computing platform 102 (e.g., in the data storage subsystem 102*f*), in which case the function of obtaining the settlement data for the given transaction that is to be provided as input data 210 for the recurring-charges model 200 may involve the computing platform 102 retrieving the settlement data for the given transaction from data storage. In this respect, the stored settlement data for the given transaction could comprise any one or more of (i) settlement data that was previously received by the computing platform 102 during the settlement process for the given transaction, (ii) settlement data that was previously generated by the computing platform 102 during or after the settlement process for the given transaction, and/or (iii) settlement data that was previously received by the computing platform 102 from some other source after the settlement process for the given transaction was completed, among other possibilities. However, it should be understood that the settlement data for the given transaction that is to be provided as input data 210 for the recurring-charges model 200 may be obtained in other manners as well.

The transaction-level data for the given transaction that could be input into the recurring-charges model 200 may include other types of transaction-level data and/or take other forms as well.

A second possible category of input data 210 for the given transaction that is to be input into the recurring-charges model 200 may comprise additional data about the given merchant involved in the given transaction, which may be referred to herein as "merchant-level data." This merchant-level data may take any of various forms.

As one possibility, the merchant-level data that could be input into the recurring-charges model 200 for the given transaction may include certain data about historical transactions involving the given merchant, which may be referred to as "historical transaction data" for the given merchant. In this respect, the historical transaction data for the given merchant may comprise a set of transaction records for certain types of historical transactions involving the given merchant (e.g., card-not-present transactions) from some timeframe in the past (e.g., the past 12 months), where each such transaction record for a given historical transaction includes information such as an identification number of the given historical transaction, a date and time of the given historical transaction, and an amount of the given historical transaction, among other possibilities. However, the historical transaction data for the given merchant could also take other forms as well.

In practice, the historical transaction data for the given merchant that could be input into the recurring-charges model 200 for the given transaction may have previously been stored by the computing platform 102 (e.g., in the data storage subsystem 102*f*), in which case the function of obtaining the historical transaction data for the given merchant that is to be input into the recurring-charges model 200 for the given transaction may generally involve the computing platform 102 (*i*) using identifying information for the given merchant that was included in the transaction-level data for the given transaction along with other criteria regarding transaction type and/or transaction timeframe in order to identify a relevant set of historical transactions involving the given merchant and (ii) retrieving the stored transaction records for the identified set of historical transactions involving the given merchant from data storage. However, it should be understood that the historical transaction data for the given merchant that is to be input into the recurring-charges model 200 for the given transaction may be obtained in other manners as well.

In at least some implementations, it is also possible that the given merchant involved in the given transaction could be associated with multiple different levels of identification numbers. For example, the given merchant could be associated with up to three different levels of merchant identification numbers (or "merchant IDs" for short) having differing scopes, where a given first-level merchant ID could encompass multiple different sub-merchants that have been assigned different second-level merchant IDs (which may take the form of merchant KYDs) and a given second-level merchant ID could in turn encompass multiple sub-sub-merchants that have been assigned different third-level merchant IDs (which may take the form of assigned transaction merchant IDs (ATIDs)). And in such an implementation, the historical transaction data for the given merchant that is used as input data 210 for the recurring-charges model 200 may comprise historical transaction data that is accessed using multiple of these different levels of merchant IDs associated with the given merchant.

To facilitate this functionality, the computing platform 102 may maintain or otherwise have access to merchant registration data that indicates the different levels of merchant IDs associated with each registered merchant, which may serve as another type of input data 210, and when obtaining the merchant-level data for the given merchant that is to be input into the recurring-charges model 200 for the given transaction, the computing platform 102 may (i) use this merchant registration data to identify the different levels of merchant IDs associated with the given merchant involved in the given transaction (to the extent such merchant IDs were not already included in the transaction-level data for the given transaction) and then (ii) obtain a respective set of historical transaction data in the manner described above for each of the different levels of merchant IDs associated with the given merchant. In this way, the recurring-charges model 200 may be capable of deriving feature data 212 that provides insight into the given merchant's historical behavior at multiple different levels of granularity, where certain of the features may be based on a higher-level merchant ID that takes other related sub-merchants and/or sub-sub-merchants into account whereas other features may be based on a lower-level merchant ID that isolates on the given merchant alone at the exclusion of other related sub-merchants and/or sub-sub-merchants.

The merchant-level data that could be input into the recurring-charges model 200 for the given transaction may include other types of merchant-level data and/or take other forms as well.

A third possible category of input data 210 for the given transaction that is to be input into the recurring-charges model 200 may comprise additional data about the relationship between the given customer account involved in the given transaction and the given merchant involved in the given transaction (i.e., the given account-merchant pair involved the given transaction), which may be referred to herein as "account-merchant-level data." This account-merchant-level data may take any of various forms.

As one possibility, the account-merchant-level data that could be input into the recurring-charges model 200 for the given transaction may include data about historical transactions involving both the given customer account and the given merchant, which may be referred to as "historical transactions data" for the given account-merchant pair. In this respect, the historical transaction data for the given account-merchant pair may comprise a set of transaction records for certain types of historical transactions involving the given account-merchant pair (e.g., card-not-present transactions) from some timeframe in the past (e.g., the past 12 months), where each such transaction record for a given historical transaction includes information such as an identification number of the given historical transaction, a date and time of the given historical transaction, and an amount of the given historical transaction, among other possibilities. However, the historical transaction data for the given account-merchant pair could also take other forms as well.

In practice, the historical transaction data for the given account-merchant pair that could be input into the recurring-charges model 200 for the given transaction may have previously been stored by the computing platform 102 (e.g., in the data storage subsystem 102*f*), in which case the function of obtaining the historical transaction data for the given account-merchant pair that is to be input into the recurring-charges model 200 for the given transaction may generally involve the computing platform 102 (i) using identifying information for the given account-merchant pair that was included in the transaction-level data for the given transaction along with other criteria regarding transaction type and/or transaction timeframe in order to identify a relevant set of historical transactions involving the given account-merchant pair and (ii) retrieving stored transaction records for the identified set of historical transactions involving the given account-merchant pair from data storage.

In at least some implementations, it is also possible that one or both of the given merchant or the given customer account could be associated with multiple different levels of identification numbers. For example, as explained above, the given merchant could be associated with up to three different levels of merchant IDs having differing scopes, among other possibilities. As another example, the given customer account could be associated with at least two different levels of account identification numbers (or "account IDs" for short) having differing scopes, where a given first-level account ID (which may take the form of an account key) could encompass multiple different sub-accounts that have been assigned different second-level account IDs (which may take the form of account numbers). And in such an implementation, the historical transaction data for the given account-merchant pair that is used as input data 210 for the recurring-charges model 200 may comprise historical transaction data that is accessed using multiple of these different levels of merchant IDs and/or account IDs associated with the given account-merchant pair. However, it should be understood that the historical transaction data for the given account-merchant pair that is to be input into the recurring-charges model 200 for the given transaction may be obtained in other manners as well.

To facilitate this functionality of obtaining the historical transaction data for the given account-merchant pair, the computing platform 102 may maintain or otherwise have access to merchant registration data that indicates the different levels of merchant IDs associated with each registered merchant and/or account registration data that indicates the different levels of account IDs associated with each registered account, which may serve as another type of input data 210, and when obtaining the account-merchant-level data for the given account-merchant pair that is to be input into the recurring-charges model 200 for the given transaction, the computing platform 102 may (i) use this merchant and/or account registration data to identify the different levels of merchant and/or account IDs associated with the given account-merchant pair involved in the given transaction (to the extent such merchant and/or account IDs were not already included in the transaction-level data for the given transaction) and then (ii) obtain a respective set of historical transaction data in the manner described above for each of the different combinations of merchant and account IDs associated with the given account-merchant pair. In this way, the recurring-charges model 200 may be capable of deriving feature data 212 that provides insight into the historical interactions between the given customer account and the given merchant at multiple different levels of granularity.

The account-merchant-level data for the given account-merchant pair that could be input into the recurring-charges model 200 for the give transaction may include other types of account-merchant-level data and/or take other forms as well.

The input data 210 for the given transaction that is to be input into the recurring-charges model 200 may take other forms as well.

As noted above, the input data 210 for the given transaction may be received by the pre-processing logic 202 of the recurring-charges model 200, which may function to transform the input data 210 into feature data 212 for the given transaction, which is then input into the machine-learning model 204. In this respect, the feature data 212 for the given transaction that is produced by the pre-processing logic 202 and input into the machine-learning model 204 may generally comprise data for any feature variables that may be predictive of whether or not the given transaction is a recurring charge. This feature data 212—and the pre-processing logic 202 that produces the feature data 212—may take any of various forms.

A first possible category of the feature data 212 for the given transaction that is produced by the pre-processing logic 202 and input into the machine-learning model 204 may comprise data for one or more feature variables that provide insight about the given transaction itself, which may be referred to herein as "transaction-level features." Such a transaction-level feature may take any of various forms.

One possible type of transaction-level feature for the given transaction may take the form of a feature that indicates whether the authorization time of the given transaction (or sometimes referred to as "transaction time") was within a particular window of time that is predictive of whether or not the given transaction is a recurring charge. For example, such a transaction-level feature may comprise an indicator of whether or not the authorization time of the given transaction was within a time window of 12:00 a.m. and 8:00 a.m.—which is a time window that has been found to be associated with recurring charges—where the indicator has a value of "1" if the authorization time was within that time window and a value of "0" if the authorization time was outside of that time window.

Another possible type of transaction-level feature for the given transaction may take the form of a feature that indicates whether the settlement (or authorization) amount of the given transaction meets certain criteria that is predictive of whether or not the given transaction is a recurring charge. For example, such a transaction-level feature may comprise an indicator of whether or not the settlement (or authorization) amount of the given transaction was (i) within a range of $1 and $50 and (ii) ended with $0.99—which is criteria that has been found to be associated with recurring charges—where the indicator has a value of "1" if the settlement (or authorization) amount of the given transaction meets that criteria and a value of "0" if the settlement (or authorization) amount of the given transaction does not meet that criteria.

Other types of transaction-level features for the given transaction could be produced by the pre-processing logic 202 and input into the machine-learning model 204 as well.

Further, in practice, the pre-processing logic 202 may produce the transaction-level feature values for the given transaction based on an evaluation of certain transaction-level data for the given transaction that is input into the recurring-charges model 200, such as authorization time and/or settlement (or authorization) amount of the given transaction, among other possible types of input data 210.

A second possible category of feature data 212 for the given transaction that is produced by the pre-processing logic 202 and input into the machine-learning model 204 may comprise data for one or more feature variables that provide insight about the historical behavior of the given merchant involved the given transaction, which may be referred to herein as "merchant-level features." Such a merchant-level feature may take any of various forms.

One possible type of a merchant-level feature for the given transaction may take the form of a feature that indicates a size of the given merchant involved in the given transaction, which may be predictive of whether or not the given transaction is a recurring charge because different sized merchants tend to engage in different behavioral patterns when submitting transactions. For example, such a merchant-level feature may comprise an indication of the number of historical transactions of a given type (e.g., card-not-present transactions) involving the given merchant that were processed during some timeframe in the past (e.g., the past 12 months). As another example, such a merchant-level feature may comprise an indication of the total settlement (or authorization) amounts of historical transactions of a given type (e.g., card-not-present transactions) involving the given merchant that were processed during some timeframe in the past (e.g., the past 12 months). Other examples are possible as well.

Another possible type of merchant-level feature for the given transaction may take the form of a feature that indicates a distribution and/or concentration of the given merchant's historical transactions of a given type (e.g., card-not-present transactions) from some timeframe in the past (e.g., the past 12 months) with respect to the settlement (or authorization) amounts, authorization dates, and/or authorization times of the historical transactions, which may be predictive of whether or not the given transaction is a recurring charge because merchants that use recurring billing tend to follow certain behavioral patterns as it relates to settlement (or authorization) amounts, authorization dates, and/or authorization times of the historical transactions.

For example, such a merchant-level feature may indicate a distribution and/or concentration of the settlement (or authorization) amounts of the given merchant's historical transactions of a given type (e.g., card-not-present transactions) from some timeframe in the past (e.g., the past 12 months), which may be predictive of whether or not the given transaction is a recurring charge because transactions submitted by merchants that use recurring billing tend to have settlement (or authorization) amounts that are concentrated at a limited number of specific values that correspond to the merchants' pricing plans (e.g., $8.99, $12.99 and $15.99). In this respect, a tighter distribution and/or higher concentration of historical settlement (or authorization) amounts for the given merchant would indicate that the given transaction is more likely to be a recurring charge, whereas a lower concentration of historical settlement (or authorization) amounts for the given merchant would indicate that the given transaction is less likely to be a recurring charge.

As another example, such a merchant-level feature may indicate a distribution and/or concentration of the authorization day of the month of the given merchant's historical transactions of a given type (e.g., card-not-present transactions) from some timeframe in the past (e.g., the past 12 months), which may be predictive of whether or not the given transaction is a recurring charge because transactions submitted by merchants that use recurring billing tend to have authorization dates that are consolidated on particular days of the month (e.g., the $17^{th}$ of every month). In this respect, a tighter distribution and/or higher concentration of historical authorization days of the month for the given merchant would indicate that the given transaction is more likely to be a recurring charge, whereas a lower concentration of historical authorization days of the month for the given merchant would indicate that the given transaction is less likely to be a recurring charge.

As yet another example, such a merchant-level feature may indicate a distribution and/or concentration of the authorization times of the given merchant's historical transactions of a given type (e.g., card-not-present transactions) from some timeframe in the past (e.g., the past 12 months), where such authorization times could be binned into any of various different time intervals (e.g., 10-minute intervals, 30-minute intervals, 60-minute intervals), which may be predictive of whether or not the given transaction is a recurring charge because transactions submitted by merchants that use recurring billing tend to have authorization times that are consolidated around certain times during the day (e.g., around 12:00 a.m.). In this respect, a tighter distribution and/or higher concentration of historical authorization times for the given merchant would indicate that the given transaction is more likely to be a recurring charge, whereas a lower concentration of historical authorization times for the given merchant would indicate that the given transaction is less likely to be a recurring charge.

A merchant-level feature that indicates the distribution and/or concentration of the given merchant's historical transactions could take some other form as well.

Yet another possible type of merchant-level feature for the given transaction may take the form of a feature that indicates an extent of the given merchant's historical transactions of a given type (e.g., card-not-present transactions) from some timeframe in the past (e.g., the past 12 months) that share a common characteristic with the given transaction, which may be predictive of whether or not the given transaction is a recurring charge because as noted above, merchants that use recurring billing tend to follow certain behavioral patterns as it relates to settlement (or authorization) amounts, authorization dates, and/or authorization times of the historical transactions.

For example, such a merchant-level feature may comprise a ratio and/or a count of the given merchant's historical transactions of a given type (e.g., card-not-present transactions) from some timeframe in the past (e.g., the past 12 months) that have a comparable settlement (or authorization) amount to the given transaction (e.g., either the exact same amount or the same amount when rounded to the nearest integer), which may be predictive of whether or not the given transaction is a recurring charge because as noted above transactions submitted by merchants that use recurring billing tend to have settlement (or authorization) amounts that are concentrated at a limited number of specific values that correspond to the merchants' pricing plans (e.g., $8.99, $12.99 and $15.99). In this respect, a higher ratio or count of the given merchant's historical transactions that have a comparable settlement (or authorization) amount to the given transaction would indicate that the given transaction is more likely to be a recurring charge, whereas a lower ratio or count of the given merchant's historical transactions that have a comparable settlement (or authorization) amount to the given transaction would indicate that the given transaction is less likely to be a recurring charge.

As another example, such a merchant-level feature may comprise a ratio and/or a count of the given merchant's historical transactions of a given type (e.g., card-not-present transactions) from some timeframe in the past (e.g., the past 12 months) that have a comparable authorization day of the month to the given transaction (e.g., either the same day of the month or within 1 day of each other), which may be predictive of whether or not the given transaction is a recurring charge because as noted above transactions submitted by merchants that use recurring billing tend to have authorization dates that are consolidated on particular days of the month (e.g., the $17^{th}$ of every month). In this respect, a higher ratio or count of the given merchant's historical transactions that were authorized on a comparable day of the month to the given transaction would indicate that the given transaction is more likely to be a recurring charge, whereas a lower ratio or count of the given merchant's historical transactions that were authorized on a comparable day of the month to the given transaction would indicate that the given transaction is less likely to be a recurring charge.

As yet another example, such a merchant-level feature may comprise a ratio and/or a count of the given merchant's historical transactions of a given type (e.g., card-not-present transactions) from some timeframe in the past (e.g., the past 12 months) that have a comparable authorization time to the given transaction (e.g., the same minute, the same second, and/or the same minute/second combination), which may be predictive of whether or not the given transaction is a recurring charge because as noted above transactions submitted by merchants that use recurring billing tend to have authorization times that are consolidated around certain times during the day (e.g., around 12:00 a.m.). In this respect, a higher ratio or count of the given merchant's historical transactions that were authorized at a comparable time to the given transaction would indicate that the given transaction is more likely to be a recurring charge, whereas a lower ratio or count of the given merchant's historical transactions that were authorized at a comparable time to the given transaction would indicate that the given transaction is less likely to be a recurring charge.

A merchant-level feature that indicates an extent of the given merchant's historical transactions that share a common characteristic with the given transaction could take some other form as well.

Other types of merchant-level features for the given transaction could be produced by the pre-processing logic 202 and input into the machine-learning model 204 as well.

Further, in practice, the pre-processing logic 202 may derive the merchant-level feature values for the given transaction based on an evaluation of the historical transaction data for the given merchant that is input into the recurring-charges model 200 and perhaps also certain transaction-level data for the given transaction that is input into the recurring-charges model 200, such as settlement (or authorization) amount, authorization date, and/or authorization time, among other possible types of input data 210.

As discussed above, in at least some implementations, it is also possible that the given merchant involved in the given transaction could be associated with multiple different levels of merchant IDs, in which case the merchant-level data for the given transaction may comprise multiple different sets of historical transaction data for the given merchant that correspond to the multiple different levels of merchant IDs. In such implementations, the feature data 212 that is produced for the given transaction could then include multiple different sets of merchant-level features that each correspond to a different respective merchant ID associated with the given merchant, where each different set of merchant-level features may include any of the various types of merchant-level features described above (e.g., features indicating merchant size, concentration of historical transactions, and/or extent of historical transactions that share common characteristics with the given transaction). For example, if the given merchant is associated with three levels of merchant IDs, the feature data 212 that is produced for the given transaction could include a first set of merchant-level features for the given transaction that correspond to a first-level merchant ID and are derived based on historical transaction data for the first-level merchant ID, a second set of merchant-level features for the given transaction that correspond to a second-level merchant ID and are derived based on historical transaction data for the second-level merchant ID, and a third set of merchant-level features for the given transaction that correspond to a third-level merchant ID and are derived based on historical transaction data for the third-level merchant ID. Many other examples are possible as well, including but not limited to the possibility that certain types of merchant-level features may only be derived for some levels of merchant IDs and not others.

A third possible category of feature data 212 for the given transaction that is produced by the pre-processing logic 202 and input into the machine-learning model 204 may comprise data for one or more feature variables that provide insight about the historical interactions between the given account-merchant pair involved the given transaction, which may be referred to herein as "account-merchant-level features." Such an account-merchant-level feature may take any of various forms.

One possible type of an account-merchant-level feature for the given transaction may take the form of a feature that indicates an extent of the given account-merchant pair's historical transactions of a given type (e.g., card-not-present transactions) from some timeframe in the past (e.g., the past 3 months, 6 months, 9 months, 13 months, etc.) that follow some type of frequency-based transaction pattern, such as a weekly, biweekly, monthly, bimonthly, quarterly, bi-annual, or annual transaction pattern (among other possibilities), which may be predictive of whether or not the given transaction is a recurring charge because when an account-merchant pair is engaged in recurring billing the pair's transactions tend to follow one of these types of frequency-based transaction pattern. In this respect, the pre-processing logic's determination of how many of the given account-merchant pair's historical transactions from some timeframe in the past follow a given frequency-based transaction pattern may be based on transaction attributes such as the settlement (or authorization) amounts of the given account-merchant pair's historical transactions, the authorization dates of the given account-merchant pair's historical transactions, and/or the authorization times of the given account-merchant pair's historical transactions, among other possibilities.

For instance, the pre-processing logic 202 may determine how many of the given account-merchant pair's historical transactions from a given timeframe in the past follow a weekly or biweekly transaction pattern by evaluating whether there are historical transactions from multiple consecutive weekly or biweekly segments within the given timeframe in the past that meet at least the following requirements: (i) the historical transactions from the multiple consecutive weekly or biweekly segments were authorized on a comparable day during the week, which could be defined as either the same day of the week or within 1 business day of each other, and (ii) the historical transactions from the multiple consecutive weekly or biweekly segments have comparable settlement (or authorization) amounts, which could be defined as amounts that are the same as each other within some tolerance (e.g., 5%) and perhaps also amounts that are a specified multiplier of each other (e.g., one amount is half or double the other amount) within some tolerance (e.g., 5%). Additionally, in some implementations, the criteria for a weekly or biweekly transaction pattern could optionally include an additional requirement that the historical transactions from the multiple consecutive weekly or biweekly segments have comparable authorization times, which could be defined as times within the same half hour or the same hour as each other. The pre-processing logic's determination of how many of the given account-merchant pair's historical transactions from a given timeframe in the past follow a weekly or biweekly transaction pattern could take other forms as well.

To illustrate with a representative example, if the given account-merchant pair was involved in 5 transactions submitted in 5 consecutive weeks within a given timeframe in the past (e.g., a 3-month timeframe) that were each authorized on a Friday (give or take 1 business day) and each had a settlement amount of $12.99, and was also involved in 3 other transactions that were also submitted at some point during those 5 consecutive weeks but have different settlement amounts and/or were authorized on different days during the week, then the pre-processing logic 202 may determine that the given account-merchant pair was involved in 5 transactions that follow a weekly transaction pattern during the given timeframe in the past.

Further, the pre-processing logic 202 may determine how many of the given account-merchant pair's historical transactions from a given timeframe in the past follow a monthly or other semi-annual (e.g., bi-monthly, quarterly, bi-annual, etc.) transaction pattern by evaluating whether there are historical transactions from multiple consecutive monthly or semi-annual segments within the given timeframe in the past that meet at least the following requirements: (i) the historical transactions from the multiple consecutive monthly or semi-annual segments were authorized on a comparable day during the month, which could be defined as either the same day of the month or a variation of 1 day, and (ii) the historical transactions from the multiple consecutive monthly or semi-annual segments have comparable settlement (or authorization) amounts, which could be defined as amounts that are the same as each other within some tolerance (e.g., 5%) and perhaps also amounts that are a specified multiplier of each other (e.g., one amount is half or double the other amount) within some tolerance (e.g., 5%). Additionally, in some implementations, the criteria for a monthly or other semi-annual (e.g., bi-monthly, quarterly, bi-annual, etc.) transaction pattern could optionally include an additional requirement that the historical transactions from the multiple consecutive monthly or semi-annual segments have comparable authorization times, which could be defined as times within the same half hour or the same hour as each other. The pre-processing logic's determination of how many of the given account-merchant pair's historical transactions from a given timeframe in the past follow a monthly, bimonthly, quarterly, or bi-annual transaction pattern could take other forms as well.

To illustrate with a representative example, if the given account-merchant pair was involved in 3 transactions submitted in 3 consecutive months within a given timeframe in the past (e.g., a 3-month timeframe) that were each authorized within 1 day of the $15^{th}$ of the month and each had a settlement amount of $12.99, and was also involved in 3 other transactions that were also submitted at some point during those 3 consecutive weeks but have different settlement amounts and/or were authorized on different days during the month, then the pre-processing logic 202 may determine that the given account-merchant pair was involved in 3 transactions that follow a monthly transaction pattern during the given timeframe in the past.

Further yet, the pre-processing logic 202 may determine how many of the given account-merchant pair's historical transactions from a given timeframe in the past follow an annual transaction pattern by evaluating whether there are historical transactions from multiple consecutive years within the given timeframe in the past that meet the following requirements: (i) the historical transactions from the multiple consecutive years were authorized in the same month, (ii) the historical transactions from the multiple consecutive years were authorized on a comparable day during the month, which could be defined as either the same day of the month or a variation of 1 day, and (iii) the historical transactions from the multiple consecutive years have comparable settlement (or authorization) amounts, which could be defined as amounts that are the same as each other within some tolerance (e.g., 5%) and perhaps also amounts that are a specified multiplier of each other (e.g., one amount is half or double the other amount) within some tolerance (e.g., 5%). Additionally, in some implementations, the criteria for an annual transaction pattern could optionally include an additional requirement that the historical transactions from the multiple consecutive years have comparable authorization times, which could be defined as times within the same half hour or the same hour as each other. The pre-processing logic's determination of how many of the given account-merchant pair's historical transactions from a given timeframe in the past follow an annual transaction pattern could take other forms as well.

To illustrate with a representative example, if the given account-merchant pair was involved in 2 transactions submitted in 2 consecutive years within a given timeframe in the past (e.g., a 13-month timeframe) that were each authorized in the same month of the year, were each authorized within 1 day of the $15^{th}$ of that month, and each had a settlement amount of $12.99, then the pre-processing logic 202 may determine that the given account-merchant pair was involved in 2 transactions that follow an annual transaction pattern during the given timeframe in the past.

The pre-processing logic's functionality for determining how many of the given account-merchant pair's historical transactions of a given type from a given timeframe in the past follow a given one of the foregoing frequency-based transaction patterns may take various other forms as well.

Moreover, an account-merchant-level feature that indicates an extent of the given account-merchant pair's historical transactions of a given type (e.g., card-not-present transactions) from a given timeframe in the past (e.g., the past 3 months, 6 months, 9 months, 13 months, etc.) that follow a given one of the foregoing frequency-based transaction patterns could take any of various forms.

As one possibility, such an account-merchant-level feature may comprise a ratio between (i) the number of the given account-merchant pair's historical transactions of a given type from a given timeframe in the past that are determined to follow a given frequency-based transaction pattern and (ii) the maximum number of transactions that could follow the given frequency-based transaction pattern during the course of the given timeframe in the past. In this respect, the pre-processing logic 202 could be configured to derive such a ratio for any of various different combinations of timeframe in the past and type of frequency-based transaction pattern, and in practice, may be configured to derive multiple account-merchant-level features comprising ratios for multiple different combinations of timeframe in the past and type of frequency-based transaction pattern.

To illustrate with one representative example, if the given timeframe in the past is 3 months and the given frequency-based transaction pattern is a weekly transaction pattern, then such an account-merchant-level feature may comprise a ratio between (i) the number of the given account-merchant pair's historical transactions of the given type from the 3 months prior to the given transaction that are determined to follow a weekly transaction pattern and (ii) the maximum number of transactions that could follow a weekly transaction pattern during the course of the 3 months prior to the given transaction, which would typically be either 12 or 13 transactions because there are typically either 12 or 13 weeks in any given 3-month timeframe. Along similar lines, if the given timeframe in the past was 6 months, then the given account-merchant pair's historical transactions would be evaluated for the preceding 6 months and the maximum number of transactions that could follow a weekly transaction pattern during that 6-month period would typically be 26 transactions, and if the given timeframe in the past was 13 months, then the given account-merchant pair's historical transactions would be evaluated for the preceding 13 months and the maximum number of transactions that could follow a weekly transaction pattern during that 13-month period would typically be 56-57 transactions. A weekly transaction pattern could be evaluated for other timeframes in the past as well.

As another representative example, if the given timeframe in the past is 3 months and the given frequency-based transaction pattern is a monthly transaction pattern, then such an account-merchant-level feature may comprise a ratio between (i) the number of the given account-merchant pair's historical transactions of the given type from the 3 months prior to the given transaction that are determined to follow a monthly transaction pattern and (ii) the maximum number of transactions that could follow a monthly transaction pattern during the course of the 3 months prior to the given transaction, which would be 3 because there are 3 months in any given 3-month timeframe. Along similar lines, if the given timeframe in the past was 6 months, then the given account-merchant pair's historical transactions would be evaluated for the preceding 6 months and the maximum number of transactions that could follow a monthly transaction pattern during that 6-month period would be 6 transactions, and if the given timeframe in the past was 13 months, then the given account-merchant pair's historical transactions would be evaluated for the preceding 13 months and the maximum number of transactions that could follow a weekly transaction pattern during that 13-month period would be 13 transactions. A monthly transaction pattern could be evaluated for other timeframes in the past as well.

As yet another representative example, if the given timeframe in the past is 13 months and the given frequency-based transaction pattern is an annual transaction pattern, then such an account-merchant-level feature may comprise a ratio between (i) the number of the given account-merchant pair's historical transactions of the given type from the 13 months prior to the given transaction that are determined to follow an annual transaction pattern and (ii) the maximum number of transactions that could follow an annual transaction pattern during the course of the 13 months prior to the given transaction, which would be 2 because the 13-month timeframe spans 2 years. An annual transaction pattern could be evaluated for other timeframes in the past as well, although the timeframe would generally need to span at least 2 years.

The pre-processing logic 202 could derive such a ratio for various other combinations of timeframe in the past and type of frequency-based transaction pattern.

As another possibility, such an account-merchant-level feature may comprise a count of how many of the given account-merchant pair's historical transactions of a given type from a given timeframe in the past are determined to follow a given frequency-based transaction pattern. In this respect, the pre-processing logic 202 could be configured to derive such a count for any of various different combinations of timeframe in the past and type of frequency-based transaction pattern and in practice, may be configured to derive multiple account-merchant-level features comprising counts for multiple different combinations of timeframe in the past and type of frequency-based transaction pattern.

An account-merchant-level feature that indicates an extent of the given account-merchant pair's historical transactions of a given type from a given timeframe in the past that follow a given frequency-based transaction pattern may take various other forms as well.

Other types of account-merchant-level features for the given transaction could be produced by the pre-processing logic 202 and input into the machine-learning model 204 as well.

Further, in practice, the pre-processing logic 202 may derive the account-merchant-level feature values for the given transaction based on an evaluation of the historical transaction data for the given account-merchant pair that is input into the recurring-charges model 200, among other possible types of input data 210.

As discussed above, in at least some implementations, it is also possible that the given account-merchant pair involved in the given transaction could be associated with multiple different levels of merchant and/or account IDs, in which case the account-merchant-level input data 210 for the given transaction may comprise multiple different sets of historical transaction data for the given account-merchant pair that correspond to the multiple different combinations of merchant and account IDs. In such implementations, the feature data 212 that is produced for the given transaction could then include multiple different sets of account-merchant-level features that each correspond to a different respective combination of merchant and account ID associated with the given account-merchant pair, where each different set of account-merchant-level features may include any of the various types of account-merchant-level features described above (e.g., features indicating ratios and/or counts of historical transactions from one or more different timeframes in the past that follow one or more different types of frequency-based transaction patterns). For example, if the given merchant is associated with three levels of merchant IDs and the given customer account is associated with two levels of account IDs, the feature data 212 that is produced for the given transaction could include up to six different sets of account-merchant-level features for the given transaction corresponding to the six possible combinations of merchant and account IDs. Many other examples are possible as well, including but not limited to the possibility that certain types of account-merchant-level features may only be derived for some combinations of merchant and account IDs and not others.

The feature data 212 for the given transaction that is produced by the pre-processing logic 202 and input into the machine-learning model 204 may take various other forms as well.

In line with the discussion above, the machine-learning model 204 may then comprise any trained model object that is configured to (i) receive the feature data 212 for the given transaction as input, (ii) evaluate the feature data 212 for the given transaction, and (iii) based on the evaluation of the feature data, determine and output a score that represents a likelihood that the given transaction is a recurring charge, which may serve as an output 214 of the recurring-charges model 200. In this respect, the machine-learning model 204 of the recurring-charges model 200 may be produced by applying a machine-learning process to historical feature data for a pool of historical transactions of a given type (e.g., card-not-present transactions) that were either recurring or non-recurring charges, where such a machine-learning process may involve any of various types of machine-learning techniques, examples of which may include regression techniques, decision-tree techniques, support vector machine (SVM) techniques, Bayesian techniques, ensemble techniques such as gradient boosting and/or descent techniques (e.g., a Gradient Boosting Machine (GBM) technique), neural network techniques, and/or clustering techniques, among various other possibilities. And relatedly, the machine-learning model that is produced by such a machine-learning process may take any of various forms, one example of which may be a GBM model, which is a type of ensemble model that is typically comprised of a sequence of decision trees.

Further, the score that is output by the machine-learning model 204, which as noted above serves as the output 214 of the recurring-charges model 200, may take various forms. As one possibility, the score may be a numerical value between 0 and 1, where a higher score represents a higher likelihood that the transaction is a recurring charge and a lower score represents a lower likelihood that the transaction is a recurring charge.

After the score for the given transaction is output by the recurring-charges model 200, the data analytics subsystem 102d that is executing the recurring-charges model 200 may then cause the given transaction's score to be stored within the computing platform 102 for future use (e.g., in the data storage subsystem 102f). Additionally, after the score for the given transaction is output by the recurring-charges model 200, the data analytics subsystem 102d may input the given transaction's score into post-processing logic 206 that functions to use the given transaction's score as a basis for determining whether or not the given transaction is a recurring charge. The post-processing logic 206 may take various forms, and in at least some implementations, the post-processing logic 206 may determine whether or not the given transaction is a recurring charge based on an evaluation of whether or not the given transaction's score satisfies a score threshold, which could be any of various values (e.g., 0.5, 0.6, 0.7, etc.) and could be adjustable over time if desired. For example, the post-processing logic 206 may be configured to compare the given transaction's score to such a score threshold and then either (i) determine that the transaction is classified as a recurring charge if the score meets or exceeds the score threshold or (ii) determine that the transaction is classified as a non-recurring charge if the score is below the score threshold. Other examples are also possible.

After the data analytics subsystem 102d has input the given transaction's score into the post-processing logic 206, the data analytics subsystem 102d may also cause an indicator of whether or not the given transaction has been classified as a recurring charge to be stored within the computing platform 102 for future use (e.g., in the data storage subsystem 102f). In turn, the computing platform 102 may utilize the stored score and/or the stored indicator for the given transaction for any of various purposes, including but not limited to facilitating interactions with the account holder of the customer account involved in the given transaction via the data output sub system 102e.

While FIG. 2 shows one possible example of a recurring-charges model that may be created and deployed in accordance with the present disclosure, it should be understood that the disclosed recurring-charges model could take other forms as well. For instance, while FIG. 2 shows an example where the post-processing logic 206 is encoded separately from the recurring-charges model 200 itself, it should be understood that in other examples, the post-processing logic 206 could be encoded within the recurring-charges model 200 itself. Further, while FIG. 2 shows an example where pre-processing logic 202 is encoded within the recurring-charges model 200 itself, it should be understood that in other examples, at least some of the pre-processing logic 202 could be encoded separately from the recurring-charges model. Further yet, while the historical transaction data for the given merchant and the given account-merchant pair is described above as examples of the types of input data 210 that may be input into the recurring-charges model 200, it should be understood that in other examples, the pre-processing logic 202 that is encoded within the recurring-charges model 200 could be tasked with obtaining the historical transaction data for the given merchant and/or the given account-merchant pair based on other input data 210 that is input into the recurring-charges model 200 (e.g., the merchant and/or account IDs included in the transaction-level data and/or the merchant and/or account registration data). The disclosed recurring-charges model could take other forms as well.

Figure 3:
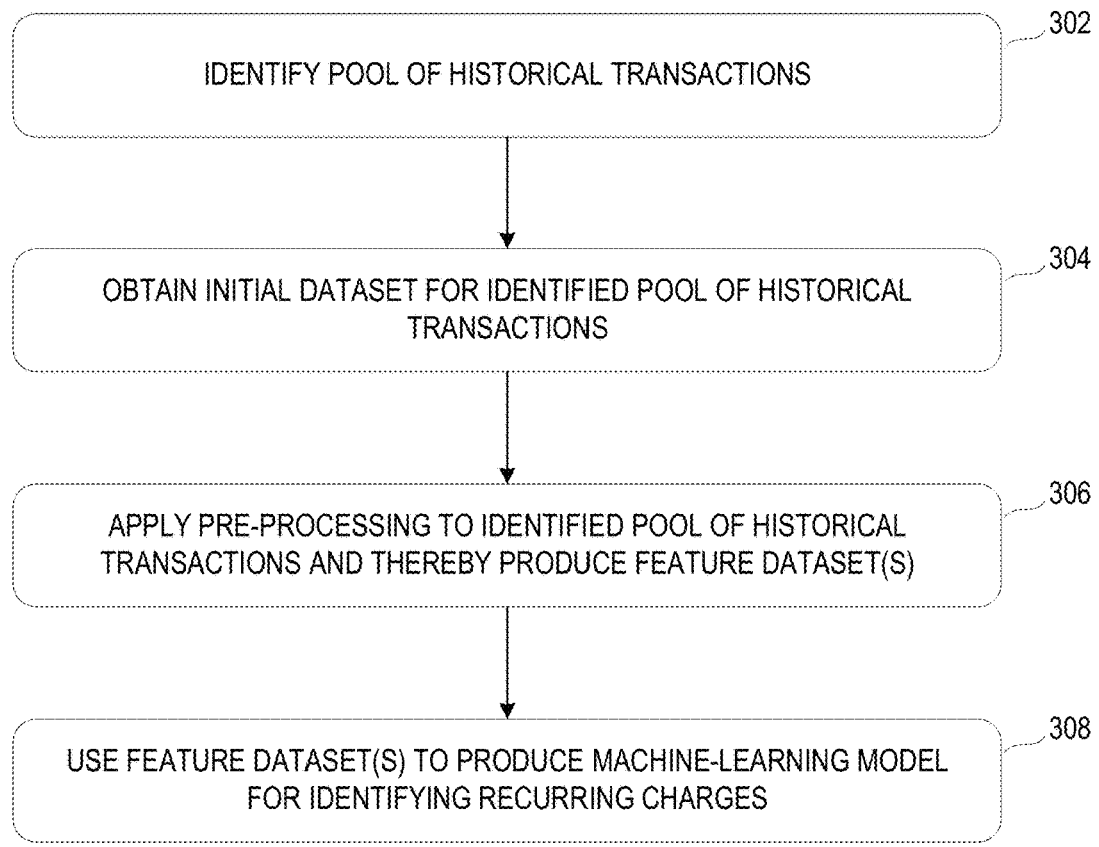
FIG. 3 depicts a flow diagram of an example process for training the data science model of FIG. 2 according to aspects of the disclosed technology.

Turning now to FIG. 3, a flow chart is provided that illustrates one possible example of a process 300 that may be carried out in order to create a recurring-charges model such as the recurring-charges model 200 in accordance with the present disclosure. For purposes of illustration only, the example process 300 is described as being carried out by the computing platform 102 shown FIGS. 1-2, and in particular the data analytics subsystem 102d of the computing platform 102, but it should be understood that the example process 300 may be carried out by any computing platform that is capable of performing the functions of FIG. 3. Further, it should be understood that, in practice, the functions described with reference to FIG. 3 may be encoded in the form of program instructions that are executable by one or more processors of the computing platform 102. Further yet, it should be understood that the example process 300 for creating the recurring-charges model 200 is merely described in this manner for the sake of clarity and explanation and that the example process 300 may be implemented in various other manners, including the possibility that functions may be added, removed, rearranged into different orders, combined into fewer blocks, and/or separated into additional blocks depending upon the particular embodiment.

The example process may begin at block 302 with the data analytics subsystem 102d identifying a pool of historical transactions to use during the creation of the recurring-charges model 200. In this respect, the data analytics subsystem 102d may identify the pool of historical transactions based on criteria regarding the type of the historical transactions (e.g., settled card-not-present sales transactions) and perhaps also the timeframe of the historical transactions, among other possibilities. Additionally, in a scenario where the machine-learning model 204 of the recurring-charges model 200 is to be trained using a supervised machine learning process, then the data analytics subsystem 102d may focus its identification on historical transactions associated with "ground truth" data that provides a sufficiently-accurate indication of whether or not the historical transactions are recurring charges, such as a binary indicator of whether or not a transaction is a recurring charge. In this respect, the data analytics subsystem's identification of the pool of historical transactions may involve an evaluation of the availability of ground truth data for the historical transactions and perhaps also an evaluation of the reliability of available ground truth data for the historical transactions (e.g., by performing some validation of the ground truth data based on other data associated with the historical transaction), among other possibilities. The function of identifying the pool of historical transactions to use during the creation of the recurring-charges model 200 may take other forms as well.

At block 304, after identifying the pool of historical transactions, the data analytics subsystem 102d may next obtain an initial (or "source") dataset for the identified pool of historical transactions that is to be used to create the recurring-charges model 200. This initial dataset may generally comprise for each historical transaction in the identified pool, a respective set of initial data that may be utilized to produce feature data for the historical transaction that is to be used to train the machine-learning model 204 during the machine learning process. In this respect, the respective set of initial data that is obtained for each historical transaction in the identified pool may include any of the various categories and types of input data described above with reference to the input data 210 of FIG. 2. For instance, the respective set of initial data that is obtained for each historical transaction may include (i) transaction-level data for the historical transaction, such as authorization data and/or settlement data for the historical transaction, (ii) merchant-level data for the historical transaction, such as historical transaction data for the particular merchant involved in the historical transaction, and/or (iii) account-merchant-level data for the historical transaction, such as historical transactions data for the particular account-merchant pair involved in the historical transaction. The initial dataset that is obtained for the identified pool of historical transactions may take other forms as well. Further, in practice, the initial dataset that is obtained for the identified pool of historical transactions could either comprise data that is already available within the data platform (e.g., data stored in data storage subsystem 102f), data that is ingested from other data sources as part of the function of obtaining the initial dataset, or some combination thereof. Further yet, in practice, the total number of historical transactions that are included in the initial dataset could be on the order of hundreds of thousands or even millions, and the total number of variables that are included in each historical transaction's set of initial data could be on the order of 100s or even 1000s of different variables.

At block 306, the data analytics subsystem 102d may next apply pre-processing logic to the initial dataset for the identified pool of historical transactions in order to transform the initial dataset into one or more feature datasets, each of may comprise respective sets of feature data for certain historical transactions in the identified pool. In this respect, the respective set of feature data that is derived for a historical transaction in the identified pool may generally comprise data for some initial universe of feature variables that could potentially provide insight into whether or not a transaction is a recurring charge. The feature variables in this initial universe may take any of various forms, including but not limited to any of the categories and types of feature variables described above with reference to feature data 212 of FIG. 2. For instance, the respective set of feature data that is derived for a historical transaction could include (i) one or more transaction-level features for the historical transaction, such as features derived based on the authorization time and/or settlement (or authorization) amount of the historical transaction, (ii) one or more merchant-level features for the historical transaction, such as features that indicate a size of the particular merchant involved in the historical transaction, a concentration of the merchant's other historical transactions (e.g., with respect to the amounts, authorization dates, and/or authorization times), and/or the extent to which the merchant's other historical transactions share a common characteristic with the historical transaction, and/or (iii) one or more account-merchant-level features for the historical transaction, such as features that indicate the extent to which the historical transactions of the account-merchant pair involved in the historical transaction follow certain types of frequency-based transaction patterns (e.g., weekly, biweekly, monthly, bimonthly, annually, etc.), among other possibilities. In practice, the total number of feature variables that are included in this initial universe could be on the order of 100s or even 1000s of feature variables.

In a scenario where the machine-learning model 204 of the recurring-charges model 200 is to be trained using a supervised machine learning process, then the data analytics subsystem 102d may also associate the respective set of feature data for each historical transaction with "ground truth" data that provides an indication of whether or not the historical transaction is a recurring charge, such as a binary indicator of whether or not a transaction is a recurring charge.

At block 308, the data analytics subsystem 102d may carry out a machine-learning process based on the one or more feature datasets in order to produce a machine-learning model that is configured to (i) receive, as input, a given set of feature data for a given transaction, (ii) evaluate the given set of feature data for the given transaction, and (iii) based on the evaluation of the given set of feature data, determine and output a score that represents a likelihood that the given transaction is a recurring charge. This machine-learning process may involve the use of any of various types of machine-learning techniques for training such a machine-learning model, examples of which may include regression techniques, decision-tree techniques, SVM techniques, Bayesian techniques, ensemble techniques such as gradient boosting and/or descent techniques (e.g., a GBM technique), neural network techniques, and/or clustering techniques, among various other, and may take any of various forms.

According to one possible example, the machine-learning process that is carried out may involve (i) training multiple different "candidate" machine-learning models based on a first feature dataset by using various different sets of hyperparameters (and perhaps also different types of machine-learning techniques) and (ii) evaluating and comparing the different candidate machine-learning models based on a second feature dataset in order to select which candidate to use as the machine-learning model 204 for the recurring-charge model 200, which may be referred to as "hyperparameter tuning." Additionally, during the course of training the different candidate machine-learning models, the machine-learning process may start by using the full universe of feature variables to train certain candidate machine-learning models but may thereafter trim down the set of feature variables that is used to train the candidate machine-learning models at one or more points during the process based on an evaluation of the contributions of the feature variables to the model's output, which may be referred to as "feature selection." The machine-learning process may take other forms as well.

Further, the machine-learning model that is produced by the machine-learning process may take any of various forms, one example of which may be a GBM model, which is a type of ensemble model that is typically comprised of a sequence of decision trees.

After the machine-learning model 204 has been produced by the machine-learning process, that machine-learning model may be packaged up together with pre-processing logic 202 for producing the model's input features and may then be deployed as the recurring-charges model 200.

The process for creating a recurring-charges model in accordance with the present disclosure may take other forms as well.

Figure 4:
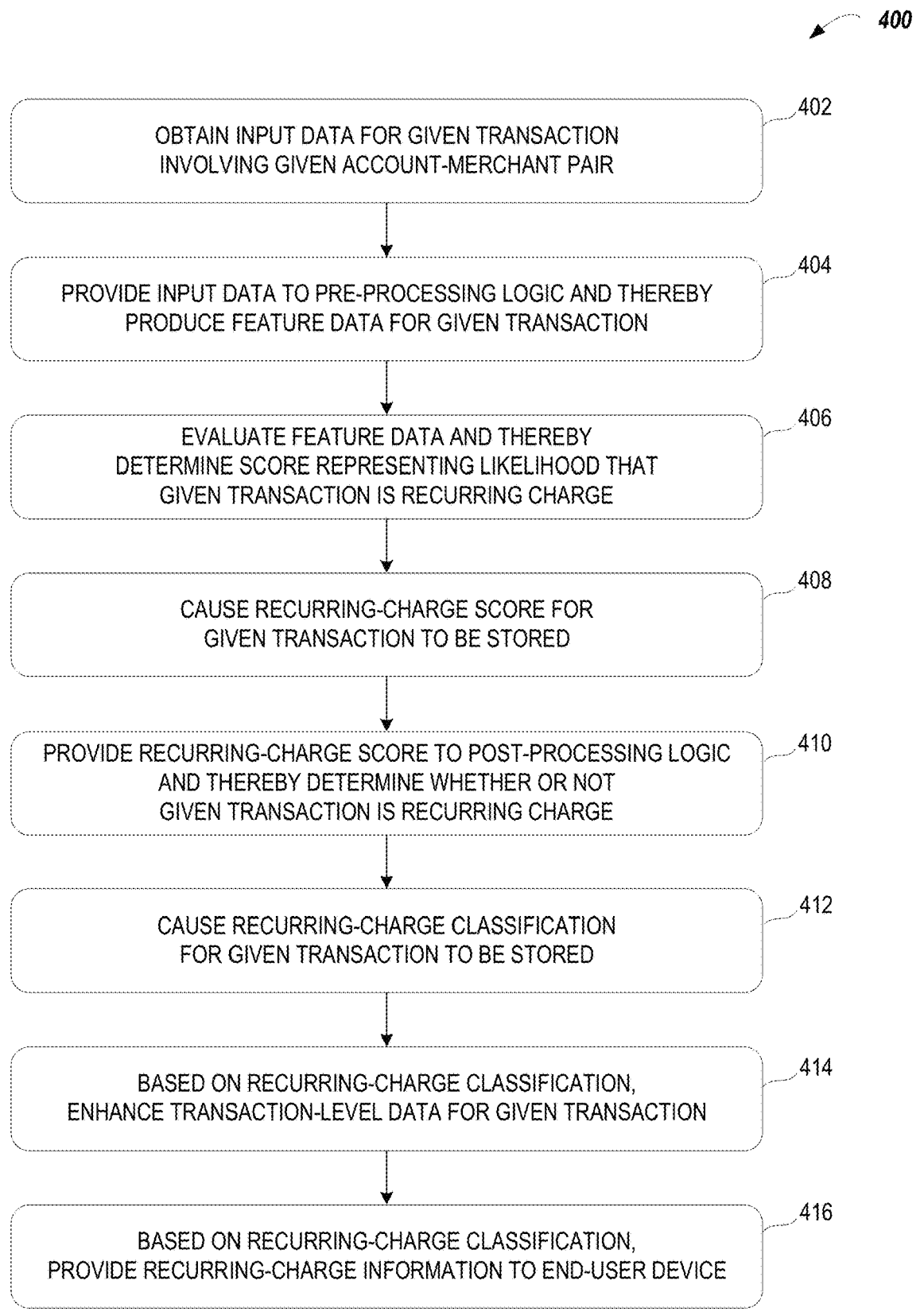
FIG. 4 depicts a flow diagram of an example process for executing the data science model of FIG. 2 according to aspects of the disclosed technology.

Turning next to FIG. 4, a flow chart is provided that illustrates one possible example of a process 400 for using a recurring-charges model such as the recurring-charges model 200 to evaluate whether a given transaction is a recurring charge. For purposes of illustration only, the example process 400 is described as being carried out by the computing platform 102 shown in FIGS. 1-2, and in particular the data analytics subsystem 102d of the computing platform 102, but it should be understood that the example process 400 may be carried out by any computing platform that is capable of performing the functions described herein with reference to FIG. 4. Further, it should be understood that, in practice, the functions described with reference to FIG. 4 may be encoded in the form of program instructions that are executable by one or more processors of the computing platform 102. Further yet, it should be understood that the example process 400 for using the recurring-charges model 200 is merely described in this manner for the sake of clarity and explanation and that the example process 400 may be implemented in various other manners, including the possibility that functions may be added, removed, rearranged into different orders, combined into fewer blocks, and/or separated into additional blocks depending upon the particular embodiment.

The example process 400 may begin at block 402 with the data analytics subsystem 102d obtaining input data for a given transaction involving a given customer account and a given merchant (i.e., a given account-merchant pair). In line with the discussion above, this input data may comprise any data that may be utilized to produce feature data for the given transaction, including but not limited to any of the various categories and types of input data described above with reference to the input data 210 of FIG. 2. For instance, such input data for the given transaction may include (i) transaction-level data for the given transaction, such as authorization data and/or settlement data for the given transaction, (ii) merchant-level data for the given transaction, such as historical transaction data for the given merchant involved in the given transaction, and/or (iii) account-merchant-level data for the given transaction, such as historical transactions data for the given account-merchant pair involved in the given transaction. Further, in practice, the input dataset that is obtained for the given could comprise data that is already stored by the computing platform 102 (e.g., in the data storage subsystem 102f), in which case the function of obtaining the transaction data for the given transaction may involve retrieving the transaction data from data storage, or could comprise data that is ingested from other data sources as part of the function of obtaining the input data, among other possibilities.

At block 404, the data analytics subsystem 102d may provide the obtained input data to the pre-processing logic 202, which may function to transform the input data into feature data for the given transaction and provide that feature data to the machine-learning model 204. In line with the discussion above, this feature data for the given transaction may generally comprise data some set of feature variables that are predictive of whether or not the given transaction is a recurring charge, which may include any of the various categories and types of feature variables described above with reference to the feature data 212 of FIG. 2. For instance, the set of feature data that is derived for the given transaction could include (i) one or more transaction-level features for the given transaction, such as features derived based on the authorization time and/or settlement (or authorization) amount of the given transaction, (ii) one or more merchant-level features for the given transaction, such as features that indicate a size of the given merchant, a concentration of the given merchant's historical transactions (e.g., with respect to the amounts, authorization dates, and/or authorization times), and/or the extent to which the given merchant's historical transactions share a common characteristic with the given transaction, and/or (iii) one or more account-merchant-level features for the given transaction, such as features that indicate the extent to which the historical transactions of the given account-merchant pair involved follow certain types of frequency-based transaction patterns (e.g., weekly, biweekly, monthly, bimonthly, annual, etc.), among other possibilities.

At block 406, the machine-learning model 204 of the recurring-charges model 200 may evaluate the feature data for the given transaction and thereby determine and output a score that represents a likelihood that the given transaction is a recurring charge, which may serve as the output 214 of the recurring-charges model 200. As described above, the score may be a numerical value between 0 and 1, where a higher score represents a higher likelihood that the given transaction is a recurring charge and a lower score represents a lower likelihood that the given transaction is a recurring charge, among other possibilities.

At block 408, the data analytics subsystem 102d may in turn cause the given transaction's recurring-charge score that is output by the recurring-charges model 200 to be stored within the computing platform 102 (e.g., in the data storage subsystem 102f). In this respect, the score could be appended to other stored data for the given transaction (e.g., authorization and/or settlement data) or could be stored separately from other stored data for the given transaction, among other possibilities.

In practice, the data analytics subsystem 102d may be triggered to carry out blocks 402-408 in order to determine (and store) the given transaction's recurring-charge score at any of various times. As one possibility, the data analytics subsystem 102d may be triggered to determine the given transaction's recurring-charge score in accordance with a pre-defined schedule. For example, the computing platform 102 may be configured to periodically determine recurring-charge scores for batches of recent transactions according to some pre-defined schedule, such as on an hourly, daily, weekly, and/or monthly basis. As another possibility, the data analytics subsystem 102d may be triggered to determine the given transaction's recurring-charge score in response to some other trigger event, which could take any of various forms, examples of which may include detecting that the given transaction is a new transaction that is available for analysis, detecting that there has been a request to access recurring-charges information for the given transaction, detecting that there has been an explicit request to score (or re-score) the given transaction, and/or detecting that some other circumstance has arisen that warrants scoring (or re-scoring) the given transaction, among other possibilities. The data analytics subsystem 102d could be triggered to determine the given transaction's recurring-charge score at other times as well.

At block 410, after the score for the given transaction is output by the recurring-charges model 200, the data analytics subsystem 102d may also input the given transaction's score into post-processing logic 206 that functions to use the given transaction's score as a basis for determining whether or not the given transaction is to be classified as a recurring charge. For example, the post-processing logic 206 may be configured to compare the given transaction's score to a score threshold and then either (i) determine that the transaction should be classified as a recurring charge if the score meets or exceeds the score threshold or (ii) determine that the transaction should be classified as a non-recurring charge if the score is below the score threshold.

At block 412, the data analytics subsystem 102d may in turn cause an indicator of the given transaction's recurring-charge classification to be stored within the computing platform 102 (e.g., in the data storage subsystem 102f). In this respect, the indicator could be appended to other stored data for the given transaction (e.g., authorization and/or settlement data) or could be stored separately from other stored data for the given transaction, among other possibilities.

In practice, the data analytics subsystem 102d may be triggered to carry out blocks 410-412 in order to determine (and store) the given transaction's recurring-charge classification at any of various times. As one possibility, the data analytics subsystem 102d may be triggered to determine the given transaction's recurring-charge classification in response to determining the given transaction's recurring-charge score (which as noted above may be carried out at various times). As another possibility, the data analytics subsystem 102d may be triggered to determine the given transaction's recurring-charge classification at a different time than when it determines the given transaction's recurring-charge score. For example, the data analytics subsystem 102d may be triggered to determine the given transaction's recurring-charge classification in accordance with a pre-defined schedule and/or in response to other trigger event that causes the given transaction's recurring-charge classification to be determined at a different time than when the given transaction's recurring-charge score is determined. The data analytics subsystem 102d could be triggered to determine the given transaction's recurring-charge classification at other times as well.

After the given transaction's recurring-charge classification is determined and stored at blocks 410-412, the computing platform 102 may then use the given transaction's recurring-charge classification as a basis for carrying out any of various different actions.

For instance, as shown at block 414 of FIG. 4, the computing platform 102 may use the recurring-charge classification of the given transaction as a basis for enhancing the transaction-level data for the given transaction. For example, the computing platform 102 may be configured such that, if the given transaction is classified as a recurring charge, the computing platform 102 may enhance the transaction-level data for the given transaction with additional data regarding the given merchant involved in the recurring transaction, such as data that provides additional information about the given merchant (e.g., additional contact information) and/or data that serves to identify other recurring charges on the same given customer account that involved the same given merchant, among other possible data regarding the given merchant involved in the recurring transaction. Thereafter, the computing platform 102 may then provide certain aspects of the enhanced transaction-level data for the given transaction along with the recurring-charge information for the given transaction, as described further below.

Further, as shown at block 416 of FIG. 4, the computing platform 102 may use the recurring-charge classification of the given transaction (and perhaps also recurring-charge classifications of other transactions involving the given customer account) as a basis for providing recurring-charge information to an end-user device associated with the account holder of the given customer account (e.g., an end-user device 106 shown in FIG. 1). The function of using the recurring-charge classification of the given transaction to provide the recurring-charge information to an end-user device associated with the account holder of the given customer account may take various forms.

As one possibility, the account holder of the given customer account may use an application running on an end-user device (e.g., a web application, mobile application, hybrid application, etc.) to submit a request to the computing platform 102 to view certain recurring-charge information for the given customer account (either individually or together with one or more other customer accounts of the account holder), such as recurring-charge information for a given timeframe in the past (e.g., the past 30 days, 60 days, 90 days, and so on). In response to receiving such a request, the computing platform 102 may then evaluate the recurring-charge classifications of transactions involving the given customer account (and perhaps one or more other customer accounts) from that given timeframe in the past—which may include the recurring-charge classification of the given transaction—to identify any recurring charges that were made in that given timeframe in the past. In turn, the computing platform 102 may access and/or derive certain data about the identified recurring charges—such as a listing of the identified recurring charges along with transaction-level data for each such recurring charge and/or a cumulative amount of the identified recurring charges over the given timeframe—and then send that recurring-charge data back to the end-user device over a data network so as to enable and cause the end-user device to present recurring-charge information to the account holder via the application running on the end-user device. Additionally, in line with the discussion above, the transaction-level data for each identified recurring charge that is accessed and sent back to the end-user device may be enhanced with certain additional data, such as additional data regarding the given merchant involved in the recurring transaction. The data about the identified recurring charges that is sent back to the end-user device may take various other forms as well.

As another possibility, if the given transaction is classified as a recurring charge, this may trigger the computing platform 102 to transmit certain recurring-charge data for the given transaction to an end-user device associated with the account holder of the given customer account over a data network that enables and causes the end-user device to present the account holder with a notification that a new recurring charge has been made on the given customer account. Such a notification may take any of various forms, examples of which may include a notification presented within an application, a mobile push notification, an email notification, and/or a text-message notification, among other possibilities. Further, in practice, the computing platform 102 could be triggered to perform this action for all transactions that are classified as a recurring charge, or could be triggered to perform this action only for certain transactions that are classified as recurring charges and also meet other criteria that governs whether recurring-charge notifications are issued to account holders (e.g., recurring charges that appear to be part of a new or different recurrence pattern than what has previously been detected on the given customer account).

The function of using the recurring-charge classification of the given transaction to provide the recurring-charge information to an end-user device associated with the account holder of the given customer account may take other forms as well.

Further, if the given transaction is classified as a recurring charge, that could trigger the computing platform 102 to perform other actions as well. As one possibility, if the given transaction is classified as a recurring charge, the computing platform 102 may be configured to (i) perform an evaluation of whether or not the given transaction has comparable characteristics to any preceding transaction that was previously classified as a recurring charge (i.e., whether or not the given transaction appears to be part of an ongoing series of recurring charges that have previously been detected), and (ii) based on this evaluation, handle the given transaction in different ways. For instance, if the given transaction does not have comparable characteristics to any preceding transaction that was previously classified as a recurring charge, but rather appears to be the first transaction in a new series of recurring charges, the computing platform 102 may then perform an analysis of the preceding transactions on the given customer account to determine whether there are any preceding transaction(s) that have comparable characteristics to the given transaction such that they should have been classified as recurring charges, but were incorrectly classified as non-recurring charges. And if any such preceding transaction is identified, the computing platform 102 may then update the recurring-charge classification of that transaction to reflect that it was also a recurring charge. In this respect, the computing platform's analysis of the preceding transactions may involve a search for preceding transactions involving the same given merchant that have certain comparable characteristics to the given transaction that has been classified as a recurring charge, such as comparable settlement amounts, comparable authorization days, and/or comparable authorization times, among other possibilities.

To illustrate, consider an example where a given merchant begins charging a given customer account on a recurring basis for a new monthly subscription service with a price of $12.99, beginning January 15th. Depending on the circumstance, it is possible that the recurring-charges model disclosed herein may not classify the January or February transactions in this new recurring transaction pattern as recurring charges based on the fact that their recurring-charge scores did not meet the applicable score threshold, but may classify the March transaction as a recurring charge. At that point, the computing platform may then be configured to perform any analysis of the preceding transactions on the given customer account, and based on that analysis, may identify the January and February transactions as ones that involve the same given merchant that have certain comparable characteristics to the given transaction, such as comparable settlement amounts, authorization days, and/or authorization times. In turn, the computing platform 102 may update the recurring-charge classification of January and February transactions to reflect that they were also recurring charges, despite the fact that their recurring-charge scores did not meet the applicable score threshold.

The process of using a recurring-charges model to evaluate whether a given transaction is a recurring charge and then taking certain actions based on the output of that recurring-charges model may take other forms as well.

While the foregoing process is described with reference to one given transaction, it should also be understood that, in practice, the computing platform 102 may carry out the foregoing process for multiple transactions across each of multiple different customer accounts. For instance, the computing platform 102 could be configured to carry out the foregoing process for all purchase transactions that are made on all customer accounts of a certain type (e.g., credit card accounts) and/or all purchase transactions that are made on customer accounts within a particular pool of customer accounts (e.g., customer accounts for which customers have elected to receive recurring-charge information), among other possibilities. In this respect, the computing platform 102 may identify the particular transactions for which to carry out the foregoing process based on any of various factors, examples of which may include the type of transaction, the type of customer account involved in the transaction, the customer's settings for the customer account involved in the transaction, and/or the timing of the transaction, among other possibilities.

FIGS. 5A-5E depict examples of graphical user interface (GUI) views that may be displayed at an end-user device to facilitate account holder interaction with the computing platform 102 with regard to recurring transactions for the account holder's financial account(s). The end-user device may be one of the end-user devices 106 shown in FIG. 1 that is configured to communicate with the computing platform 102 (e.g., the data output subsystem 102e) over a data network to access information about the account holder's financial account(s).

Figure 5A:
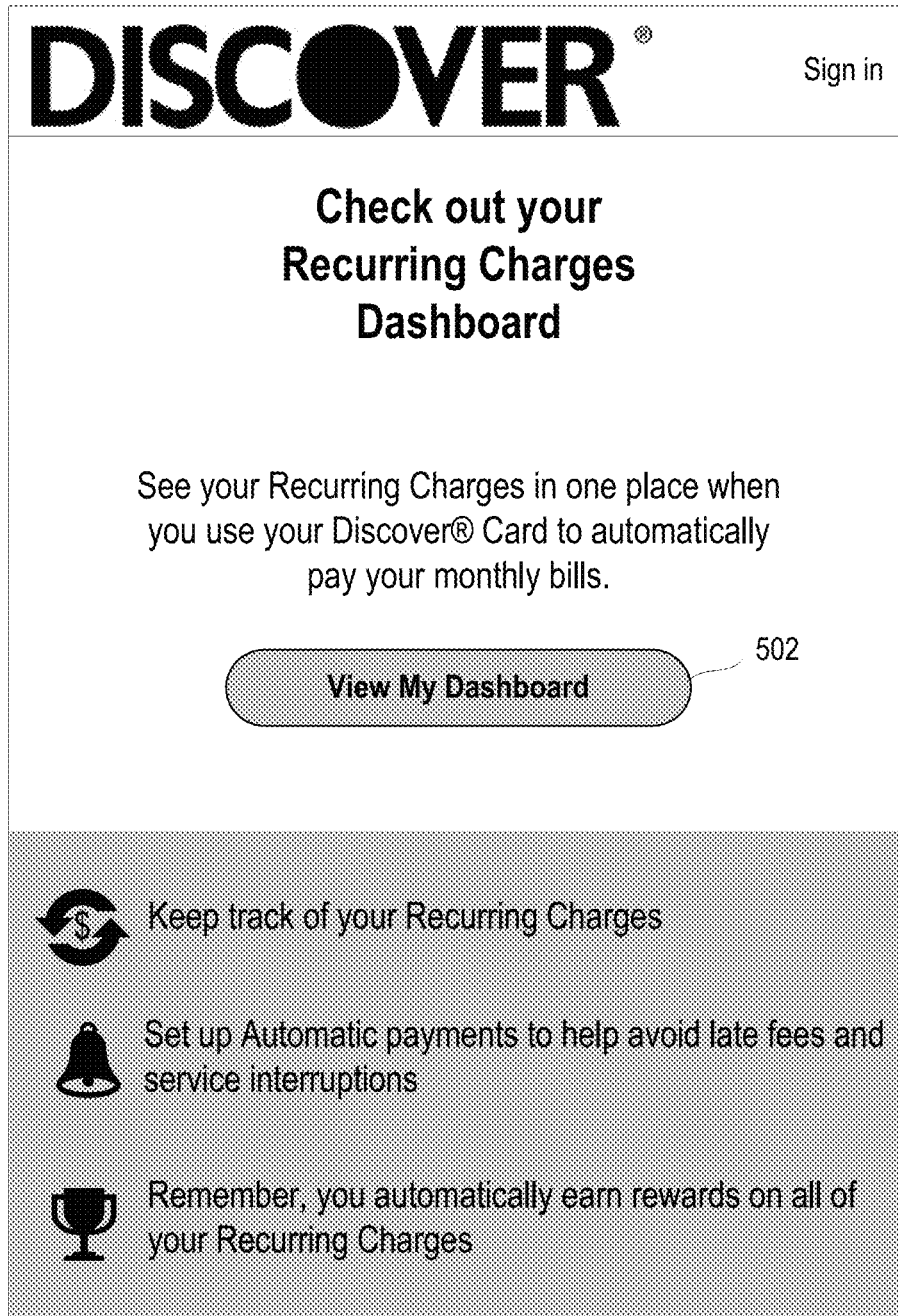
FIG. 5A depicts a screenshot an example landing page of an application for accessing and viewing recurring-charges information.

Referring first to FIG. 5A, a screenshot of an example landing page 500 of an application for accessing and viewing recurring-charges information is shown. The example landing page 500 may include a selectable GUI button 502 that enables an account holder to access a dashboard for reviewing recurring-charge information for one or more financial accounts of the account holder. This recurring-charges dashboard could take any of various forms.

Figure 5B:
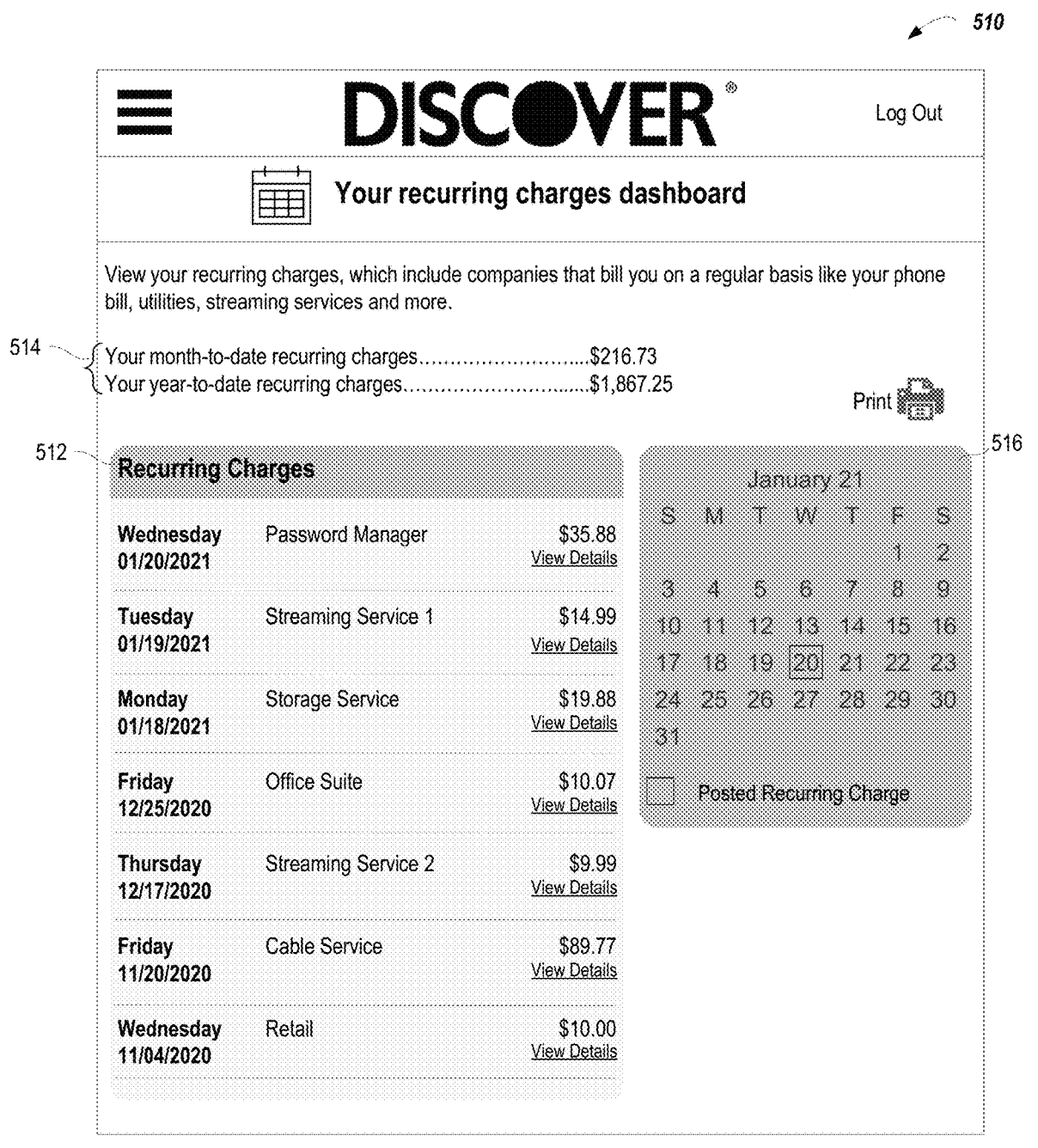

FIG. 5B depicts a screenshot of one possible example GUI view 510 that may be displayed at an end-user device after an account holder accesses a recurring-charges dashboard, perhaps by selection of the GUI button 502 of FIG. 5A. As shown in FIG. 5B, the example GUI view 510 includes a listing 512 of respective visual representations for recurring transactions that have been identified for the account holder's financial account, where each recurring transaction's respective visual representation includes date information, merchant/service information, and transaction amount information for the recurring transaction. Additionally, each recurring transaction's respective visual representation also includes a selectable "View Details" option that enables the account holder to access further details about the recurring transaction. Additionally yet, the example GUI view 510 also includes aggregated transaction amount information 514 for recurring charges during certain periods of time (e.g., month-to-date, year-to-date, etc.) and an interactive calendar pane 516 that shows one or more particular days on which recurring charges were posted and may be selectable to show recurring charges that were posted on a given date.

Figure 5C:
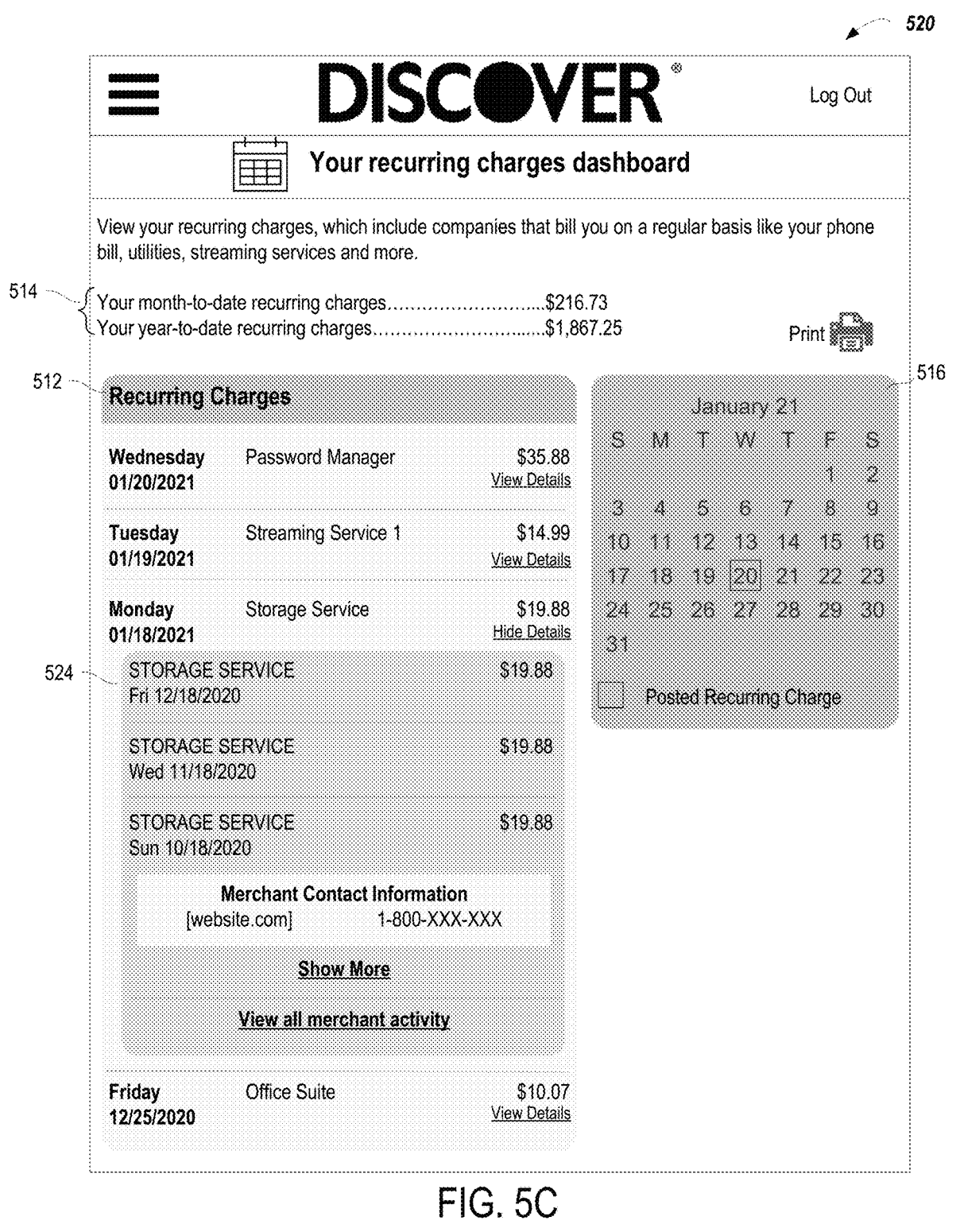

FIG. 5C depicts a screenshot of another possible example GUI view 520 that may be displayed at an end-user device after an account holder accesses a recurring-charges dashboard and selects an option to "View Details" about a given recurring charge. For instance, the example GUI view 520 may be displayed after a "View Details" option associated with a given respective visual in the listing 512 of FIG. 5B has been selected. As shown in FIG. 5C, the example GUI view 520 includes the listing 512 of respective visual representations for recurring transactions that have been identified for the account holder's financial account, the aggregated transaction amount information 514 for recurring charges during certain periods of time (e.g., month-to-date, year-to-date, etc.), and the calendar pane 516 previously shown in FIG. 5B. As shown in FIG. 5C, the example GUI view 520 is shown at a time when the "View Details" option has been selected for the January 18 charge from "Storage Service" for an amount of $19.88, which has caused a details pane 524 to appear underneath the visual representation for the January 18 charge from "Storage Service." As shown, this details pane 524 may include additional information for the January 18 charge that includes a listing of other recent charges from "Storage Service" and merchant contact information for "Storage Service," as well as selectable options for viewing more recent charges from "Storage Service" or perhaps viewing all past charges from "Storage Service." Additionally yet, the respective visual representation for the January 18 charge has been updated to include a selectable "Hide Details" option to collapse or otherwise exit the details pane 524.

The GUI views that are displayed at an end-user device after an account holder accesses a recurring-charges dashboard may take various other forms as well.

Figure 5E:
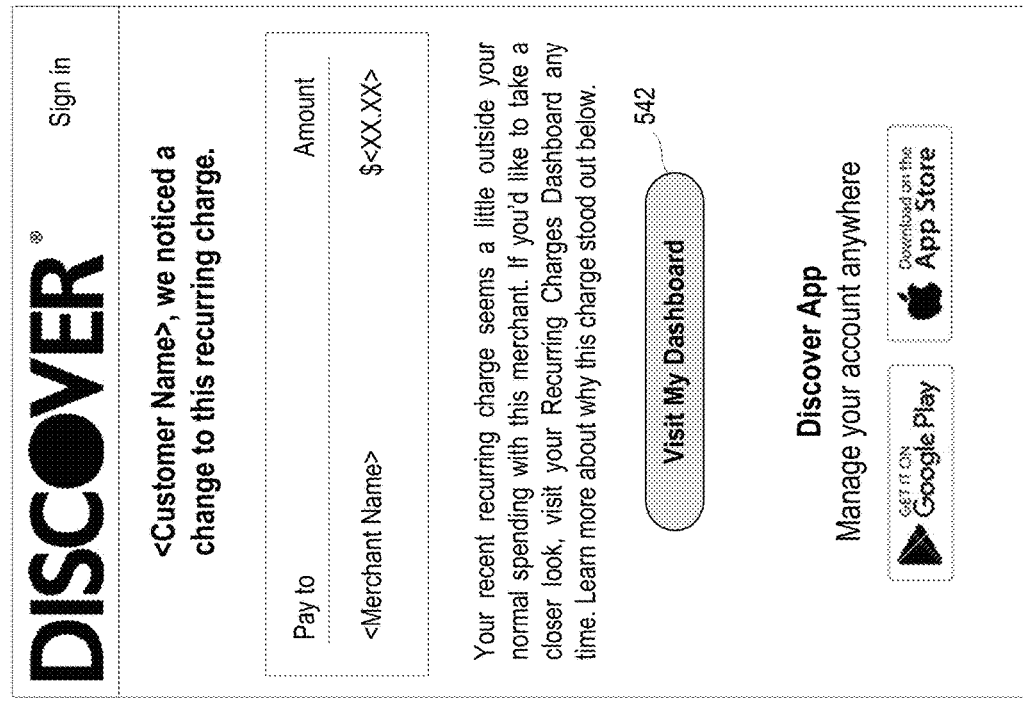
FIG. 5E depicts a screenshot of an example GUI view that may be displayed at an end-user device associated with an account holder to notify the account holder that a recent recurring charge involving a given merchant appears to diverge from a previously-identified pattern of recurring charges involving the given merchant.
Figure 5D:
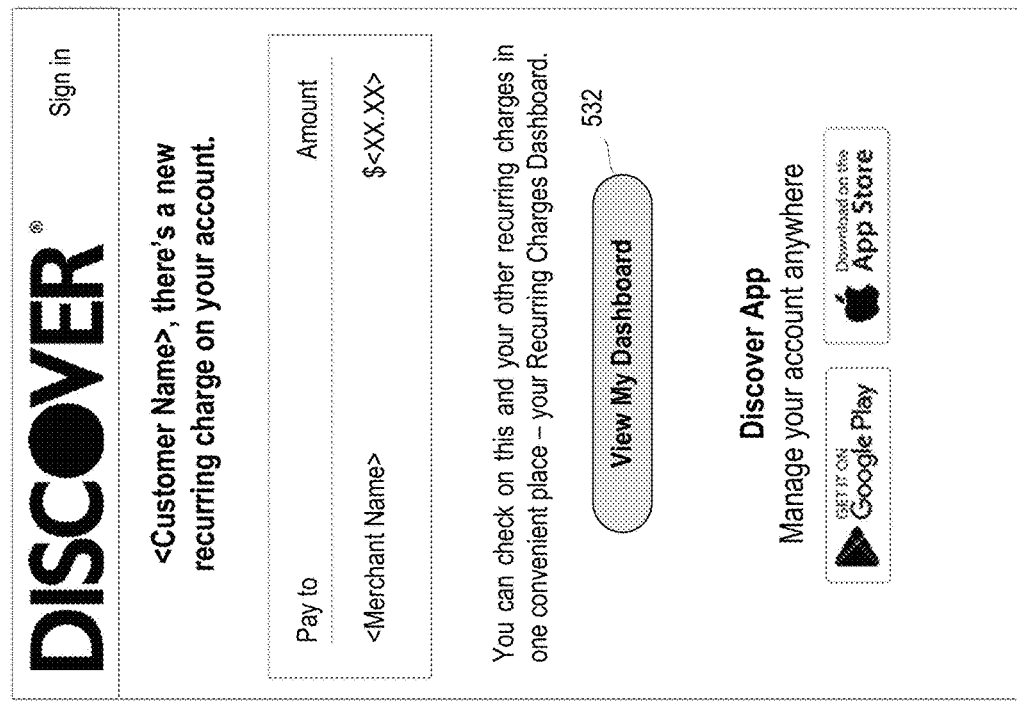
FIG. 5D depicts a screenshot of an example GUI view that may be displayed at an end-user device associated with an account holder to notify the account holder that a new recurring charge has been identified.

In turn, FIG. 5D depicts a screenshot of an example GUI view 530 that may be displayed at an end-user device associated with an account holder to notify the account holder that a new recurring charge has been identified for an account of the account holder. As shown, the example GUI view 530 includes some basic information about the new recurring charge, such as a merchant name and a transaction amount, and also enables the account holder to select a GUI element 532 to access a recurring-charges dashboard that provides further information about the new recurring charge Lastly, FIG. 5E depicts a screenshot of an example GUI view 540 that may be displayed at an end-user device associated with an account holder to notify the account holder that a recent recurring charge for an account of the account holder involving a given merchant appears to diverge from a previously-identified pattern of recurring charges involving the given merchant and the account of the account holder. As shown, the example GUI view 540 includes some basic information about the recent recurring charge, such as a merchant name and a transaction amount, and also enables the account holder to select a GUI element 542 to access a recurring-charges dashboard that provides further information about the new recurring charge.

Figure 6:
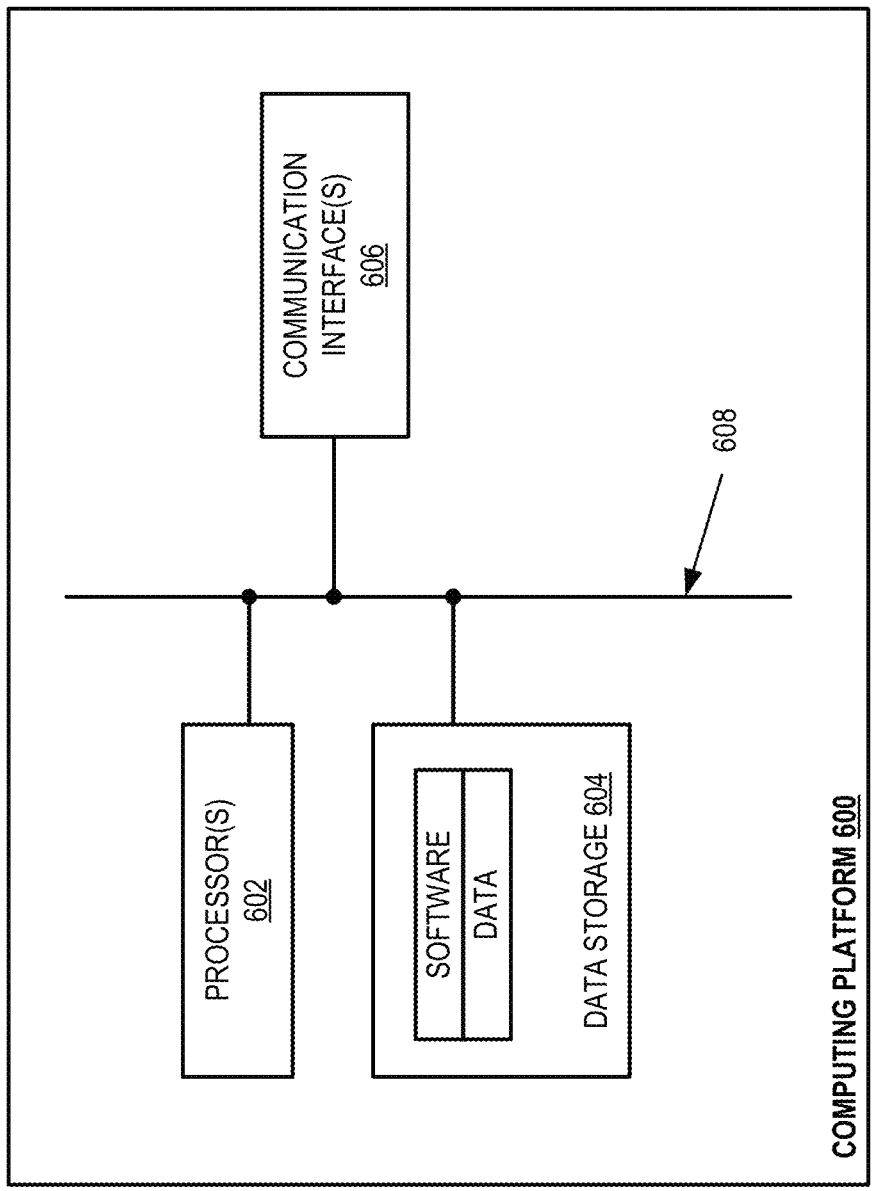
FIG. 6 depicts example structural components of an example computing platform that is configured to perform functions according to aspects of the disclosed technology.

Turning now to FIG. 6, a simplified block diagram illustrating some structural components that may be included in an example computing platform 600 is shown. The example computing platform 600 may serve as, for instance, the computing platform 102 of FIG. 1 that may be configured to create and run the disclosed recurring-charges model. At a high level, the example computing platform 600 may comprise one or more computer systems (e.g., one or more servers), and these one or more computer systems may collectively include at least one or more processors 602, data storage 604, and one or more communication interfaces 606, all of which may be communicatively linked by a communication link 608 that may take the form of a system bus, a communication network such as a public, private, or hybrid cloud, or some other connection mechanism.

The one or more processors 602 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that the processor 602 could comprise processing components that are distributed across a plurality of physical computing devices connected via a network, such as a computing cluster of a public, private, or hybrid cloud.

In turn, the data storage 604 may comprise one or more non-transitory computer-readable storage mediums that are collectively configured to store (i) program instructions that are executable by the processor 602 such that computing platform 600 is configured to perform some or all of the functions disclosed herein, and (ii) data that may be received, derived, or otherwise stored, for example, in one or more databases, file systems, or the like, by the computing platform 600 in connection with the disclosed functions. In this respect, the one or more non-transitory computer-readable storage mediums of the data storage 604 may take various forms, examples of which may include volatile storage mediums such as random-access memory, registers, cache, etc., and non-volatile storage mediums such as read-only memory, hard-disk drive(s), solid-state drive(s), flash memory, or optical-storage device(s), etc. In line with the discussion above, it should also be understood that the data storage 604 may comprise computer-readable storage mediums that are distributed across a plurality of physical computing devices connected via a network, such as a storage cluster of a public, private, or hybrid cloud. The data storage 604 may take other forms and/or store data in other manners as well.

The one or more communication interfaces 606 may be configured to facilitate wireless and/or wired communication with external data sources and/or end-user devices, such as one or more end-user devices 106 of FIG. 1. Additionally, in an implementation where the computing platform 600 comprises a plurality of physical computing devices connected via a network, the communication interface 606 may be configured to facilitate wireless and/or wired communication between these physical computing devices (e.g., between computing and storage clusters in a cloud network). As such, the communication interface 606 may facilitate communications according to any of various communications protocols, examples of which may include Ethernet, serial bus (e.g., Firewire, USB 3.0, etc.), Wi-Fi, cellular network, short-range wireless protocols, and/or any other communication protocol that provides for wired and/or wireless communication. The communication interface 606 may also include multiple communication interfaces of different types. Other configurations are possible as well.

Although not shown, the computing platform 600 may additionally include or have one or more interfaces for connecting to user-interface components that facilitate user interaction with the computing platform 600, such as a keyboard, a mouse, a trackpad, a display screen, a touch-sensitive interface, a stylus, a virtual-reality headset, and/or speakers, among other possibilities, which may allow for direct user interaction with the computing platform 600.

It should be understood that the computing platform 600 is one example of a computing platform that may be used with the embodiments described herein. Numerous other arrangements are possible and contemplated herein. For instance, other computing platforms may include additional components not pictured and/or more or fewer of the pictured components.

Figure 7:
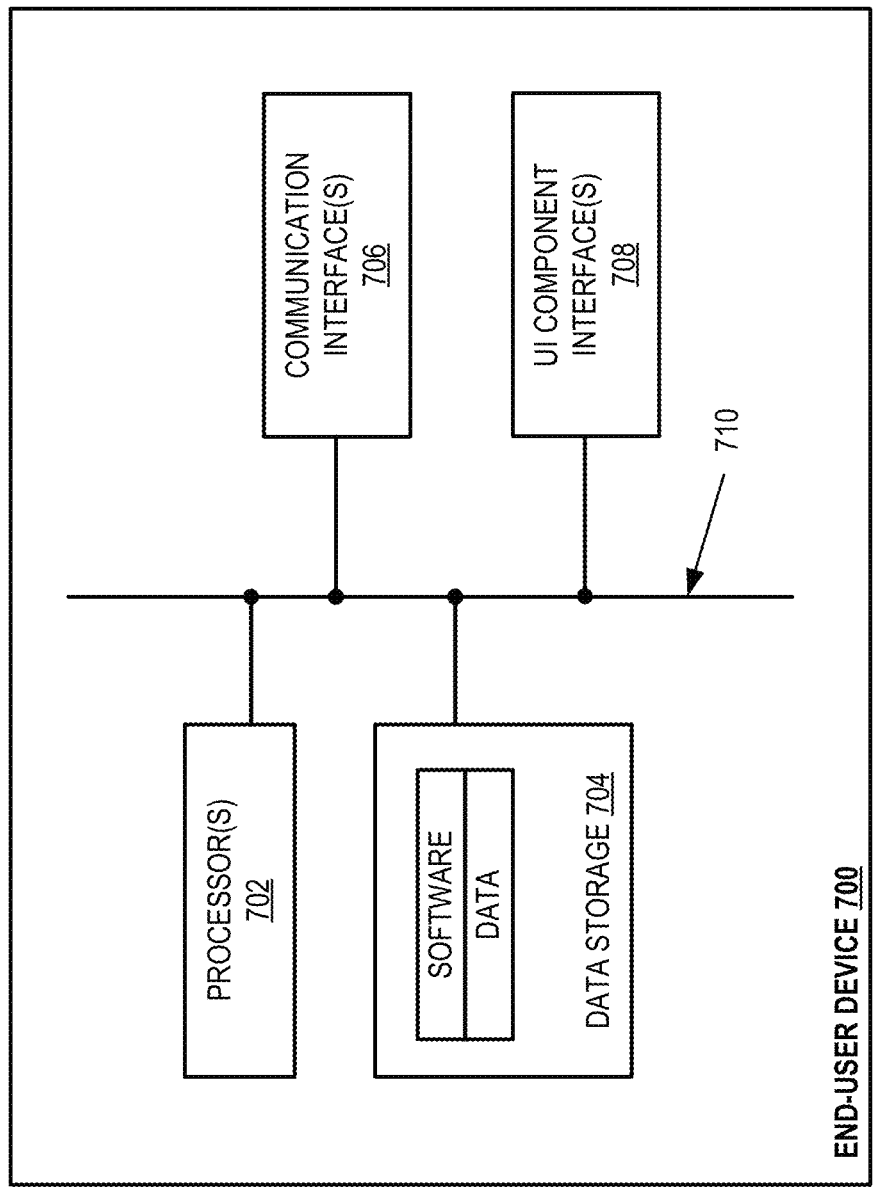
FIG. 7 depicts example structural components of an example end-user device that is configured to interact with the example computing platform of FIG. 6.

Turning now to FIG. 7, a simplified block diagram is provided to illustrate some structural components that may be included in an example end-user device 700, such as an end-user device 106 described above with reference to FIG. 1. As shown in FIG. 7, the end-user device 700 may include one or more processors 702, data storage 704, one or more communication interfaces 706, and one or more user-interface components interfaces 708, all of which may be communicatively linked by a communication link 710 that may take the form of a system bus or some other connection mechanism. Each of these components may take various forms.

The one or more processors 702 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

In turn, the data storage 704 may comprise one or more non-transitory computer-readable storage mediums that are collectively configured to store (i) program instructions that are executable by the processor(s) 702 such that the end-user device 700 is configured to perform certain functions related to interacting with and accessing services provided by a computing platform, such as the example computing platform 600 described above with reference to FIG. 6, and (ii) data that may be received, derived, or otherwise stored, for example, in one or more databases, file systems, repositories, or the like, by the end-user device 700, related to interacting with and accessing services provided by a computing platform. In this respect, the one or more non-transitory computer-readable storage mediums of the data storage 704 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. The data storage 704 may take other forms and/or store data in other manners as well.

The one or more communication interfaces 706 may be configured to facilitate wireless and/or wired communication with other computing devices. The communication interface(s) 706 may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The end-user device 700 may additionally include or have one or more interfaces 708 for one or more user-interface components that facilitate user interaction with the end-user device 700, such as a keyboard, a mouse, a trackpad, a display screen, a touch-sensitive interface, a stylus, a virtual-reality headset, and/or one or more speaker components, among other possibilities.

It should be understood that the end-user device 700 is one example of an end-user device that may be used to interact with a computing platform as described herein. Numerous other arrangements are possible and contemplated herein. For instance, in other embodiments, the end-user device 700 may include additional components not pictured and/or more or fewer of the pictured components.

In the ways described above, the disclosed software technology provides several improvements and advantages over existing technology for identifying recurring transactions and presenting information about such identified recurring transactions to account holders.

CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," "parties," or other entities, this is for purposes of example and explanation only. Claims should not be construed as requiring action by such actors unless explicitly recited in claim language.

The invention claimed is:

1. A computing platform comprising:
a network interface;
at least one processor;
at least one non-transitory computer-readable medium; and
program instructions stored on the at least one non-transitory computer-readable medium that are executable by the at least one processor such that the computing platform is configured to:
identify a pool of historical transactions involving multiple different customer accounts and multiple different merchants;
generate a training dataset comprising, for each historical transaction in the pool of historical transactions, (i) feature data for the historical transaction and (ii) an indicator of whether or not the historical transaction is a recurring charge;
apply a supervised machine learning process to the training dataset and thereby train a machine-learning model that functions to predict whether a transaction involving a customer account and a merchant is a recurring charge without relying on any encoded recurring transaction indicator for the transaction by (a) evaluating feature data for the transaction, wherein the evaluated feature data comprises values for (i) at least one transaction-level feature that is derived based on transaction-level data for the transaction and is independent from any recurring transaction indicator that is encoded within the transaction-level data for the transaction, (ii) at least one merchant-level feature that is derived based on historical transaction data for past transactions involving the merchant, and (iii) multiple account-merchant-level features that are derived based on historical transaction data for past transactions involving both the customer account and the merchant, and (b) based on the evaluation of the feature data, outputting a score for the transaction that indicates a predicted likelihood that the transaction is a recurring charge, wherein:
the at least one transaction-level feature comprises at least one of (1) an indication of whether a transaction time of the transaction was within a defined window of time or (2) an indication of whether a transaction amount of the transaction was within a defined range of amounts;
the at least one merchant-level feature comprises at least one of (1) an indication of a size of the merchant involved in the transaction, (2) an indication of a concentration of the merchant's historical transactions with respect to transaction dates, transaction times, or transaction amounts, or (3) an indication of an extent of the merchant's historical transactions that share at least one common characteristic with the transaction; and
the multiple account-merchant-level features comprise at least (1) an indication of an extent of historical transactions involving both the customer account and the merchant that follow a first type of frequency-based transaction pattern and (2) an indication of an extent of historical transactions involving both the customer account and the merchant that follow a second type of frequency-based pattern, wherein the second type of frequency-based pattern differs from the first type of frequency-based transaction pattern;
for each respective transaction of a plurality of transactions involving multiple different customer accounts and multiple different merchants:
obtain data for a respective transaction involving a respective customer account and a respective merchant that has been previously processed within a networked payment environment;
apply pre-processing logic to the obtained data for the respective transaction and thereby derive feature data for the respective transaction that includes respective values for (i) the at least one transaction-level feature, (ii) the at least one merchant-level feature, and (iii) the multiple account-merchant-level features;
input the feature data for the respective transaction into the trained machine-learning model and thereby determine a score for the respective transaction that indicates a likelihood that the respective transaction is a recurring charge; and
based on the score for the respective transaction, determine whether to classify the respective transaction as a recurring charge;
after classifying a given transaction involving a given customer account and a given merchant as a recurring charge, cause an account holder of the given customer account to be presented with a notification that the given transaction has been classified as a recurring charge, wherein the notification comprises one of a mobile push notification, an email notification, or a text-message notification, wherein the notification is presented via a networked end-user device associated with the account holder, and wherein the notification includes a selectable element for accessing a recurring-charges dashboard;
receive, from the networked end-user device associated with the account holder, an indication that the account holder has selected the selectable element for accessing the recurring-charges dashboard that was included in the notification; and
in response to receiving the indication, cause the account holder of the given customer account to be presented with an instance of the recurring-charges dashboard that comprises a listing of transactions involving the given customer account that have been classified as recurring charges, wherein each respective transaction in the listing of transactions is associated with a selectable element that, when selected, causes the instance of the recurring-charges dashboard to present any one or more other transactions involving the given customer account and a same merchant as the listed transaction that are determined to be related to the respective transaction.

2. The computing platform of claim 1, wherein the obtained data for the respective transaction includes (i) transaction-level data for the respective transaction, (ii) merchant-level data for the respective transaction, and (iii) account-merchant-level data for the respective transaction.

3. The computing platform of claim 2, wherein the transaction-level data for the respective transaction comprises one or both of authorization data for the respective transaction or settlement data for the respective transaction.

4. The computing platform of claim 2, wherein the merchant-level data for the respective transaction comprises historical transaction data for past transactions involving the respective merchant.

5. The computing platform of claim 2, wherein the account-merchant-level data for the respective transaction comprises historical transaction data for past transactions involving the respective customer account and the respective merchant.

6. The computing platform of claim 1, wherein the first type of frequency-based transaction pattern and the second type of frequency-based transaction pattern comprise first and second ones of a weekly transaction pattern, a bi-weekly transaction pattern, a monthly transaction pattern, a bi-monthly transaction pattern, a quarterly transaction pattern, a bi-annual transaction pattern, or an annual transaction pattern.

7. The computing platform of claim 1, wherein the trained machine-learning model comprises a gradient boosting machine (GBM) model.

8. The computing platform of claim 1, wherein the program instructions that are executable by the at least one processor such that the computing platform is configured to determine whether to classify the respective transaction as a recurring transaction comprise program instructions that are executable by the at least one processor such that the computing platform is configured to:
compare the score for the respective transaction to a score threshold; and based on the comparison, either (i) determine that the respective transaction is classified as a recurring charge if the score meets or exceeds the score threshold or (ii) determine that the respective transaction is classified as a non-recurring charge if the score is below the score threshold.

9. The computing platform of claim 1, further comprising program instructions stored on the at least one non-transitory computer-readable medium that are executable by the at least one processor such that the computing platform is configured to:
store the score that represents the likelihood that the respective transaction is a recurring transaction; and
store an indication of whether the respective transaction is classified as a recurring charge or a non-recurring charge.

10. At least one non-transitory computer-readable medium, wherein the at least one non-transitory computer-readable medium is provisioned with program instructions that, when executed by at least one processor cause a computing platform to:
identify a pool of historical transactions involving multiple different customer accounts and multiple different merchants;
generate a training dataset comprising, for each historical transaction in the pool of historical transactions, (i) feature data for the historical transaction and (ii) an indicator of whether or not the historical transaction is a recurring charge;
apply a supervised machine learning process to the training dataset and thereby train a machine-learning model that functions to predict whether a transaction involving a customer account and a merchant is a recurring charge without relying on any encoded recurring transaction indicator for the transaction by (a) evaluating feature data for the transaction, wherein the evaluated feature data comprises values for (i) at least one transaction-level feature that is derived based on transaction-level data for the transaction and is independent from any recurring transaction indicator that is encoded within the transaction-level data for the transaction, (ii) at least one merchant-level feature that is derived based on historical transaction data for past transactions involving the merchant, and (iii) multiple account-merchant-level features that are derived based on historical transaction data for past transactions involving both the customer account and the merchant, and (b) based on the evaluation of the feature data, outputting a score for the transaction that indicates a predicted likelihood that the transaction is a recurring charge, wherein:
the at least one transaction-level feature comprises at least one of (1) an indication of whether a transaction time of the transaction was within a defined window of time or (2) an indication of whether a transaction amount of the transaction was within a defined range of amounts;
the at least one merchant-level feature comprises at least one of (1) an indication of a size of the merchant involved in the transaction, (2) an indication of a concentration of the merchant's historical transactions with respect to transaction dates, transaction times, or transaction amounts, or (3) an indication of an extent of the merchant's historical transactions that share at least one common characteristic with the transaction; and
the multiple account-merchant-level features comprise at least (1) an indication of an extent of historical transactions involving both the customer account and the merchant that follow a first type of frequency-based transaction pattern and (2) an indication of an extent of historical transactions involving both the customer account and the merchant that follow a second type of frequency-based pattern, wherein the second type of frequency-based pattern differs from the first type of frequency-based transaction pattern;
for each respective transaction of a plurality of transactions involving multiple different customer accounts and multiple different merchants:
obtain data for a respective transaction involving a respective customer account and a respective merchant that has been previously processed within a networked payment environment;
apply pre-processing logic to the obtained data for the respective transaction and thereby derive feature data for the respective transaction that includes respective values for (i) the at least one transaction-level feature, (ii) the at least one merchant-level feature, and (iii) the multiple account-merchant-level features;
input the feature data for the respective transaction into the trained machine-learning model and thereby determine a score for the respective transaction that indicates a likelihood that the respective transaction is a recurring charge; and
based on the score for the respective transaction, determine whether to classify the respective transaction as a recurring charge;
after classifying a given transaction involving a given customer account and a given merchant as a recurring charge, cause an account holder of the given customer account to be presented with a notification that the given transaction has been classified as a recurring charge, wherein the notification comprises one of a mobile push notification, an email notification, or a text-message notification, wherein the notification is presented via a networked end-user device associated with the account holder, and wherein the notification includes a selectable element for accessing a recurring-charges dashboard;
receive, from the networked end-user device associated with the account holder, an indication that the account holder has selected the selectable element for accessing the recurring-charges dashboard that was included in the notification; and
in response to receiving the indication, cause the account holder of the given customer account to be presented with an instance of the recurring-charges dashboard that comprises a listing of transactions involving the given customer account that have been classified as recurring charges, wherein each respective transaction in the listing of transactions is associated with a selectable element that, when selected, causes the instance of the recurring-charges dashboard to present any one or more other transactions involving the given customer account and a same merchant as the listed transaction that are determined to be related to the respective transaction.

11. The at least one non-transitory computer-readable medium of claim 10, wherein the obtained data for the respective transaction includes (i) transaction-level data for the respective transaction, (ii) merchant-level data for the respective transaction, and (iii) account-merchant-level data for the respective transaction.

12. The at least one non-transitory computer-readable medium of claim 11, wherein the transaction-level data for the respective transaction comprises one or both of authorization data for the respective transaction or settlement data for the respective transaction.

13. The at least one non-transitory computer-readable medium of claim 11, wherein the merchant-level data for the respective transaction comprises historical transaction data for past transactions involving the respective merchant.

14. The at least one non-transitory computer-readable medium of claim 11, wherein the account-merchant-level data for the respective transaction comprises historical transaction data for past transactions involving the respective customer account and the respective merchant.

15. A method carried out by a computing platform, the method comprising:
   identifying a pool of historical transactions involving multiple different customer accounts and multiple different merchants;
   generating a training dataset comprising, for each historical transaction in the pool of historical transactions, (i) feature data for the historical transaction and (ii) an indicator of whether or not the historical transaction is a recurring charge;
   applying a supervised machine learning process to the training dataset and thereby training a machine-learning model that functions to predict whether a transaction involving a customer account and a merchant is a recurring charge without relying on any encoded recurring transaction indicator for the transaction by (a) evaluating feature data for the transaction, wherein the evaluated feature data comprises values for (i) at least one transaction-level feature that is derived based on transaction-level data for the transaction and is independent from any recurring transaction indicator that is encoded within the transaction-level data for the transaction, (ii) at least one merchant-level feature that is derived based on historical transaction data for past transactions involving the merchant, and (iii) multiple account-merchant-level features that are derived based on historical transaction data for past transactions involving both the customer account and the merchant, and (b) based on the evaluation of the feature data, outputting a score for the transaction that indicates a predicted likelihood that the transaction is a recurring charge, wherein:
      the at least one transaction-level feature comprises at least one of (1) an indication of whether a transaction time of the transaction was within a defined window of time or (2) an indication of whether a transaction amount of the transaction was within a defined range of amounts;
      the at least one merchant-level feature comprises at least one of (1) an indication of a size of the merchant involved in the transaction, (2) an indication of a concentration of the merchant's historical transactions with respect to transaction dates, transaction times, or transaction amounts, or (3) an indication of an extent of the merchant's historical transactions that share at least one common characteristic with the transaction; and
      the multiple account-merchant-level features comprise at least (1) an indication of an extent of historical transactions involving both the customer account and the merchant that follow a first type of frequency-based transaction pattern and (2) an indication of an extent of historical transactions involving both the customer account and the merchant that follow a second type of frequency-based pattern, wherein the second type of frequency-based pattern differs from the first type of frequency-based transaction pattern;
   for each respective transaction of a plurality of transactions involving multiple different customer accounts and multiple different merchants:
      obtaining data for a respective transaction involving a respective customer account and a respective merchant that has been previously processed within a networked payment environment;
      applying pre-processing logic to the obtained data for the respective transaction and thereby deriving feature data for the respective transaction that includes respective values for (i) the at least one transaction-level feature, (ii) the at least one merchant-level feature, and (iii) the multiple account-merchant-level features;
      inputting the feature data for the respective transaction into the trained machine-learning model and thereby determining a score for the respective transaction that indicates a likelihood that the respective transaction is a recurring charge; and
      based on the score for the respective transaction, determining whether to classify the respective transaction as a recurring charge;
   after classifying a given transaction involving a given customer account and a given merchant as a recurring charge, causing an account holder of the given customer account to be presented with a notification that the given transaction has been classified as a recurring charge, wherein the notification comprises one of a mobile push notification, an email notification, or a text-message notification, wherein the notification is presented via a networked end-user device associated with the account holder, and wherein the notification includes a selectable element for accessing a recurring-charges dashboard;
   receiving, from the networked end-user device associated with the account holder, an indication that the account holder has selected the selectable element for accessing the recurring-charges dashboard that was included in the notification; and
   in response to receiving the indication, causing the account holder of the given customer account to be presented with an instance of the recurring-charges dashboard that comprises a listing of transactions involving the given customer account that have been classified as recurring charges, wherein each respective transaction in the listing of transactions is associated with a selectable element that, when selected, causes the instance of the recurring-charges dashboard to present any one or more other transactions involving the given customer account and a same merchant as the listed transaction that are determined to be related to the respective transaction.

16. The computing platform of claim 1, wherein the at least one transaction-level feature comprises multiple transaction-level features and the at least one merchant-level feature comprises multiple merchant-level features.

17. The computing platform of claim 1, wherein the multiple account-merchant-level features comprise an indication of an extent of historical transactions involving both the customer account and the merchant that follow a third type of frequency-based pattern, wherein the third type of frequency-based pattern differs from both the first type of frequency-based transaction pattern and the second type of frequency-based transaction pattern.

18. The at least one non-transitory computer-readable medium of claim 10, wherein the first type of frequency-based transaction pattern and the second type of frequency-based transaction pattern comprise first and second ones of a weekly transaction pattern, a bi-weekly transaction pattern, a monthly transaction pattern, a bi-monthly transaction pattern, a quarterly transaction pattern, a bi-annual transaction pattern, or an annual transaction pattern.

19. The method of claim 15, wherein the first type of frequency-based transaction pattern and the second type of frequency-based transaction pattern comprise first and second ones of a weekly transaction pattern, a bi-weekly transaction pattern, a monthly transaction pattern, a bi-monthly transaction pattern, a quarterly transaction pattern, a bi-annual transaction pattern, or an annual transaction pattern.

* * * * *